United States Patent
Nagatoshi

(10) Patent No.: US 9,383,559 B2
(45) Date of Patent: Jul. 5, 2016

(54) ZOOM LENS AND IMAGING APPARATUS

(71) Applicant: FUJIFILM CORPORATION, Tokyo (JP)

(72) Inventor: Yukiko Nagatoshi, Saitama-Ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/629,550

(22) Filed: Feb. 24, 2015

(65) Prior Publication Data

US 2015/0241673 A1 Aug. 27, 2015

(30) Foreign Application Priority Data

Feb. 26, 2014 (JP) .................................. 2014-034898

(51) Int. Cl.
| | | |
|---|---|---|
| *G02B 15/14* | (2006.01) | |
| *G02B 15/167* | (2006.01) | |
| *G02B 15/16* | (2006.01) | |
| *G02B 15/177* | (2006.01) | |
| *G02B 15/163* | (2006.01) | |

(52) U.S. Cl.
CPC .............. *G02B 15/167* (2013.01); *G02B 15/16* (2013.01); *G02B 15/163* (2013.01); *G02B 15/177* (2013.01)

(58) Field of Classification Search
CPC ........ G02B 15/14; G02B 15/15; G02B 15/16; G02B 15/20; G02B 15/22; G02B 15/24; G02B 13/009
USPC .................................. 359/676–679, 683–685
See application file for complete search history.

(56) References Cited

U.S. PATENT DOCUMENTS

| | | | |
|---|---|---|---|
| 4,135,786 A | 1/1979 | Ikemori | |
| 5,561,560 A | 10/1996 | Tsutsumi | |
| 6,278,559 B1 | 8/2001 | Yahagi | |
| 6,512,637 B1 | 1/2003 | Tomita | |
| 2010/0149652 A1* | 6/2010 | Imamura | G02B 15/163 359/676 |
| 2011/0122506 A1* | 5/2011 | Ito | G02B 15/173 359/683 |
| 2012/0013991 A1* | 1/2012 | Uchida | G02B 15/14 359/676 |
| 2012/0229689 A1 | 9/2012 | Saori | |

FOREIGN PATENT DOCUMENTS

| | | |
|---|---|---|
| JP | 2009-198656 | 9/2009 |
| JP | 4463909 | 2/2010 |
| JP | 2012-189817 | 10/2012 |
| JP | 2012211973 A * | 11/2012 |

OTHER PUBLICATIONS

German Search Report—10 2015102 577.9—Sep. 30, 2015.

* cited by examiner

*Primary Examiner* — Darryl J Collins
(74) *Attorney, Agent, or Firm* — Young & Thompson

(57) ABSTRACT

A zoom lens consists essentially of, in order from the object side, a positive first lens group, a positive second lens group, a negative third lens group, a negative fourth lens group, and a positive fifth lens group. During magnification change from the wide-angle end to the telephoto end, the first lens group and the fifth lens group are fixed relative to the image plane, and the second lens group, the third lens group, and the fourth lens group are moved along the optical axis direction to change distances between the lens groups.

20 Claims, 15 Drawing Sheets

FIG.2
WIDE
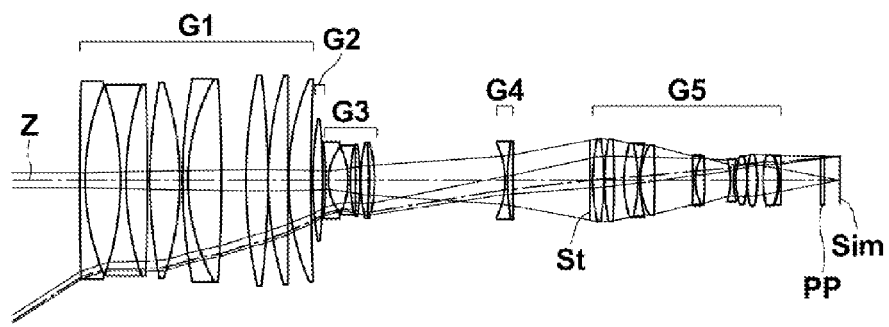
MIDDLE
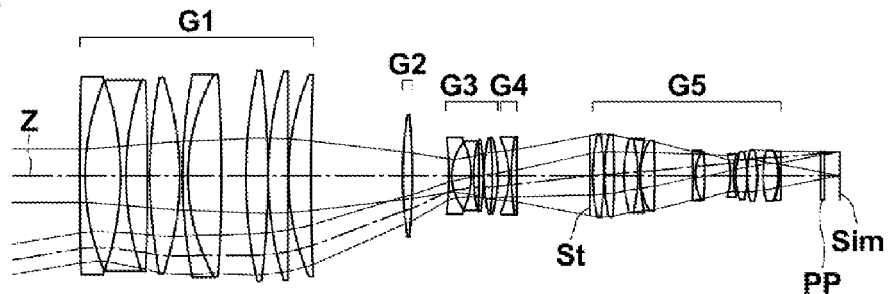
TELE
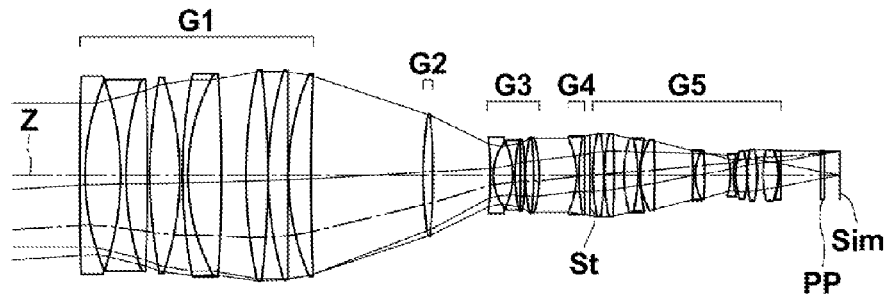

FIG.11
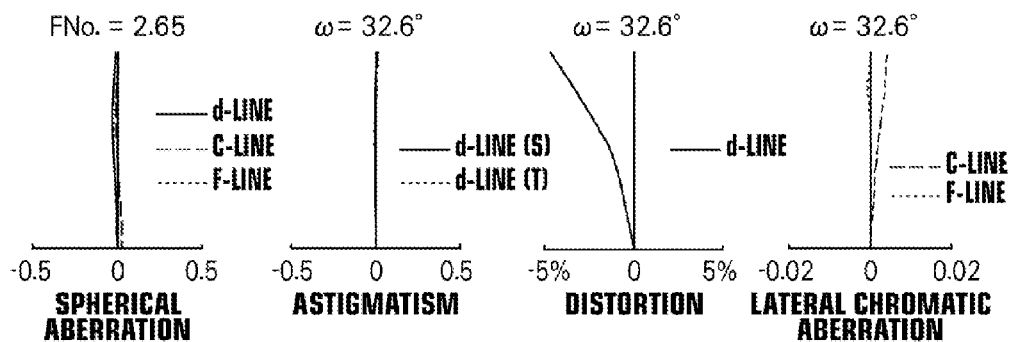
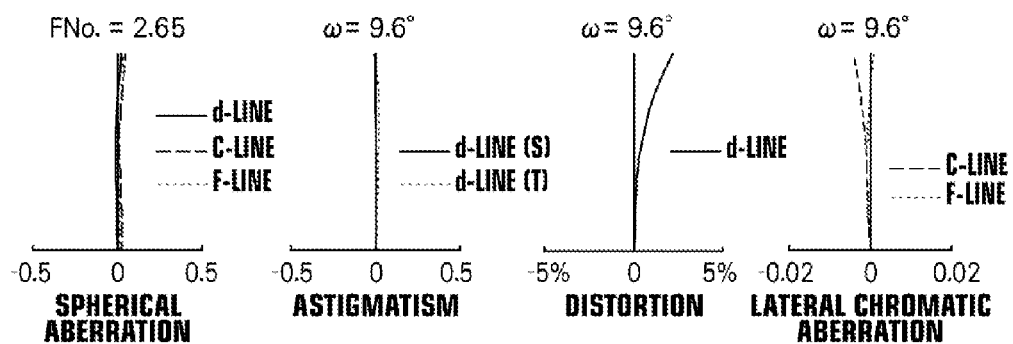
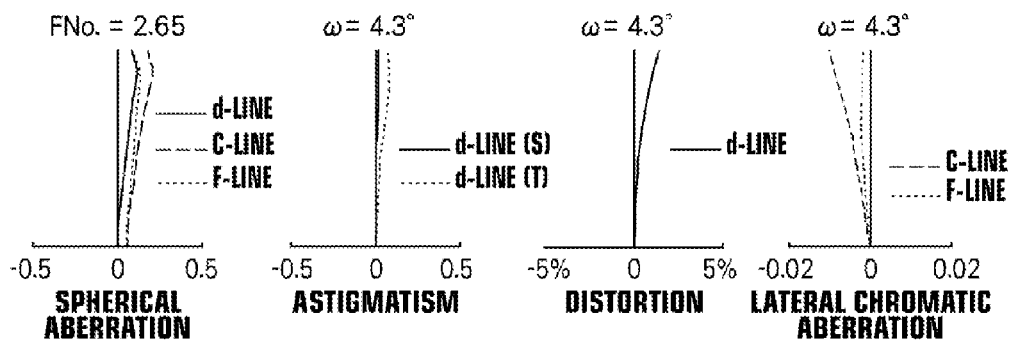

ZOOM LENS AND IMAGING APPARATUS

CROSS-REFERENCE TO RELATED APPLICATIONS

The present application claims priority under 35 U.S.C. §119 to Japanese Patent Application No. 2014-034898, filed on Feb. 26, 2014. The above application is hereby expressly incorporated by reference, in its entirety, into the present application.

BACKGROUND OF THE INVENTION

1. Field of the Invention

The present invention relates to a zoom lens and an imaging apparatus, and more particularly to a zoom lens that is suitable for use with digital cameras, video cameras, motion-picture cameras, broadcasting cameras, monitoring cameras, etc., and an imaging apparatus provided with the zoom lens.

2. Description of the Related Art

As zoom lenses having a four- or more group configuration that is applicable to imaging apparatuses of the above-described fields, those disclosed in Japanese Patent No. 4463909 and Japanese Unexamined Patent Publication Nos. 2012-189817 and 2009-198656 (hereinafter, Patent Documents 1, 2, and 3, respectively), for example, have conventionally been proposed. Patent Document 1 discloses a zoom lens that consists of, in order from the object side, a first lens group having a positive refractive power, a second lens group having a negative refractive power, a third lens group, and a fourth lens group having a positive refractive power, wherein, during magnification change from the wide-angle end to the telephoto end, the first lens group and the fourth lens group are fixed relative to the image plane, and the second lens group and the third lens group are moved relative to the image plane. Patent Document 2 discloses a zoom lens that consists of, in order from the object side, a first-a lens group having a positive refractive power, a first-b lens group having a positive refractive power, a second lens group having a negative refractive power, a third lens group having a positive refractive power, and a fourth lens group having a positive refractive power, wherein, during magnification change from the wide-angle end to the telephoto end, the first-a lens group and the fourth lens group are fixed relative to the image plane, and the first-b lens group, the second lens group, and the third lens group are moved relative to the image plane. Patent Document 3 discloses a zoom lens that consists of, in order from the object side, a first lens group having a positive refractive power, a second lens group having a positive refractive power, a third lens group having a negative refractive power, a fourth lens group having a positive refractive power, and an imaging group, wherein, during magnification change from the wide-angle end to the telephoto end, the first lens group and the imaging group are fixed relative to the image plane, and the second lens group, the third lens group, and the fourth lens group are moved relative to the image plane.

SUMMARY OF THE INVENTION

With respect to a zoom lens for use with cameras such as motion-picture cameras and broadcasting cameras, there are increasing demands for a compact and high performance zoom lens, and, in recent years, there are additional demands for a zoom lens that can exhibit good performance across the entire zoom range while achieving a high magnification. However, in the lens system disclosed in Patent Document 1, the diameter of the most object-side lens and the entire length of the lens system are large relative to an image size. Each of the lens systems disclosed in Patent Documents 2 and 3 has a zoom ratio of less than 3× and is not deemed to be a high-magnification zoom lens.

In view of the above-described circumstances, the present invention is directed to providing a zoom lens that is compact, can preferably suppress change of aberrations during magnification change while achieving a high magnification, and has high optical performance, as well as an imaging apparatus provided with the zoom lens.

A first aspect of the zoom lens of the invention consists essentially of five lens groups consisting of, in order from an object side: a first lens group having a positive refractive power; a second lens group having a positive refractive power; a third lens group having a negative refractive power; a fourth lens group having a negative refractive power; and a fifth lens group having a positive refractive power, wherein, during magnification change from the wide-angle end to the telephoto end, the first lens group and the fifth lens group are fixed relative to an image plane, and the second lens group, the third lens group, and the fourth lens group are moved along the optical axis direction to change distances between the lens groups.

In the first aspect of the zoom lens of the invention, it is preferred that the condition expression (1) below be satisfied:

$$5 < f2/fw \qquad (1),$$

where $f2$ is a focal length of the second lens group, and $fw$ is a focal length of the entire system at the wide-angle end.

A second aspect of the zoom lens of the invention consists essentially of five lens groups consisting of, in order from the object side: a first lens group having a positive refractive power; a second lens group having a positive refractive power; a third lens group having a negative refractive power; a fourth lens group; and a fifth lens group having a positive refractive power, wherein, during magnification change from the wide-angle end to the telephoto end, the first lens group and the fifth lens group are fixed relative to an image plane, the second lens group, the third lens group, and the fourth lens group are moved along the optical axis direction to change distances between the lens groups, and the condition expression (1) below is satisfied:

$$5 < f2/fw \qquad (1),$$

where $f2$ is a focal length of the second lens group, and $fw$ is a focal length of the entire system at the wide-angle end.

It is preferred that first and second aspects of the zoom lens of the invention satisfy one of or any combination of the condition expressions (2) to (5), and (1-1) to (5-1) below:

$$10 < f2/fw < 50 \qquad (1\text{-}1),$$

$$0.005 < \Delta G2m/(TL \times Zr) < 0.050 \qquad (2),$$

$$0.010 < \Delta G2m/(TL \times Zr) < 0.020 \qquad (2\text{-}1),$$

$$TL/Y < 40 \qquad (3),$$

$$TL/Y < 32 \qquad (3\text{-}1),$$

$$1.75 < Nd31 \qquad (4),$$

$$1.80 < Nd31 \qquad (4\text{-}1),$$

$$-10 < f4/fw < -1 \qquad (5),$$

$$-7 < f4/fw < -3 \qquad (5\text{-}1),$$

where $f2$ is a focal length of the second lens group, $f4$ is a focal length of the fourth lens group, $fw$ is a focal length of the entire system at the wide-angle end, $\Delta G2m$ is a positional difference along the optical axis between the position of the second lens group at the wide-angle end and the position of the second lens group at the telephoto end, TL is a distance along the optical axis from the most object-side surface of the first lens group to the image plane, Zr is a zoom ratio, Y is a maximum image height, and Nd31 is a refractive index with respect to the d-line of the most object-side lens of the third lens group.

It is preferred that, in the first and the second aspects of the zoom lens of the invention, the position of the second lens group at the telephoto end be on the image side of the position of the second lens group at the wide-angle end.

It is preferred that, in the first and the second aspects of the zoom lens of the invention, the position of the third lens group at the telephoto end be on the image side of the position of the third lens group at the wide-angle end.

It is preferred that, in the first and the second aspects of the zoom lens of the invention, the fourth lens group have a negative refractive power, and the position of the fourth lens group at the telephoto end be on the image side of the position of the fourth lens group at the wide-angle end.

It is preferred that, in the first and the second aspects of the zoom lens of the invention, the first lens group consist essentially of, in order from the object side, a first lens-group front group having a negative refractive power, a first lens-group middle group having a positive refractive power, and a first lens-group rear group having a positive refractive power, and only the first lens-group middle group be moved along the optical axis direction during focusing.

The imaging apparatus of the invention comprises the above-described zoom lens of the invention.

The "lens group" as used herein may not necessarily be formed by a plurality of lenses, and may include a lens group formed by one lens.

It should be noted that the expression "consisting/consist essentially of" as used herein means that the zoom lens may include, besides the elements recited above, lenses substantially without any power, and optical elements other than lenses, such as a stop, a cover glass, and filters.

The sign (positive or negative) with respect to the refractive power and the surface shape of any lens including an aspheric surface described herein are about the paraxial region.

The zoom lens according to the invention has a five-group configuration, where arrangement of the refractive powers of the lens groups and the lens group that are moved during magnification change are preferably set. This configuration allows providing a zoom lens that is compact, can preferably suppress change of aberrations during magnification change while achieving a high magnification, and has high optical performance, as well as an imaging apparatus provided with the above-described zoom lens.

BRIEF DESCRIPTION OF THE DRAWINGS

FIG. 2 is a diagram illustrating the lens configuration of and optical paths through the zoom lens shown in FIG. 1, where the state at the wide-angle end is shown at the top, the state at the middle focal length is shown at the middle, and the state at the telephoto end is shown at the bottom, FIG. 11 shows aberration diagrams of the zoom lens of Example 3 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

DESCRIPTION OF THE PREFERRED EMBODIMENTS

Figure 1:
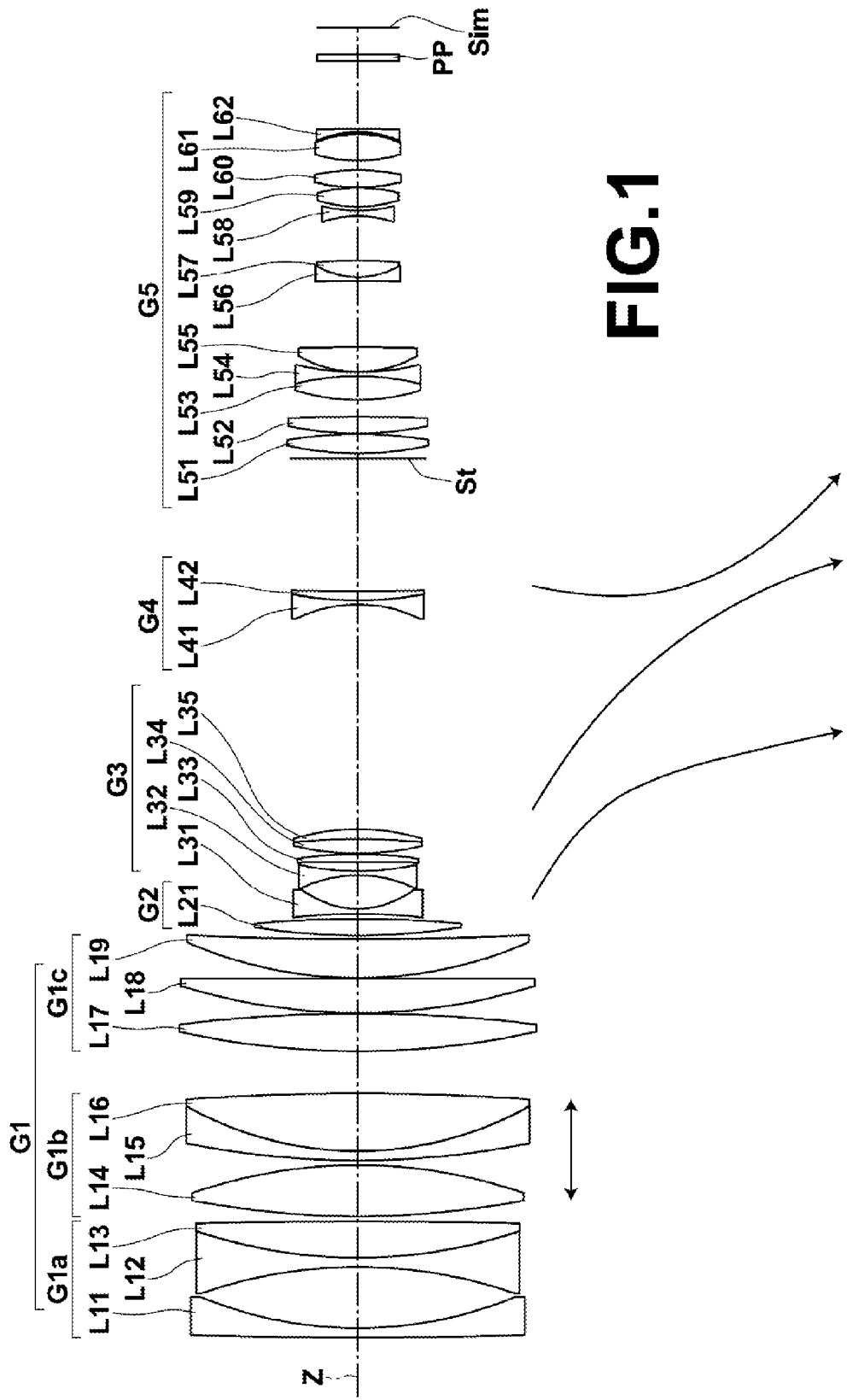
FIG. 1 is a sectional view illustrating the lens configuration at the wide-angle end of a zoom lens according to one embodiment of the invention.

Hereinafter, embodiments of the present invention will be described in detail with reference to the drawings. FIG. 1 is a sectional view illustrating the lens configuration at the wide-angle end of a zoom lens according to one embodiment of the invention when the zoom lens is focused on an object at infinity. FIG. 2 illustrates the lens configuration of the zoom lens shown in FIG. 1 when the zoom lens is focused on an object at infinity, and optical paths of an axial bundle of rays and a bundle of rays at the maximum image height. In FIG. 2, the state at the wide-angle end is shown at the top denoted by the text "WIDE", the state at the middle focal length is shown at the middle denoted by the text "MIDDLE", and the state at the telephoto end is shown at the bottom denoted by the text "TELE". It should be noted that the example shown in FIGS. 1 and 2 corresponds to Example 1, which will be described later. On FIGS. 1 and 2, the left side is the object side, and the right side is the image side.

When this zoom lens is mounted on an imaging apparatus, it is preferred to provide a protective cover glass, and various filters, such as a low-pass filter and an infrared cut-off filter, depending on the specifications of the imaging apparatus. In the example shown in FIGS. 1 and 2, an optical member PP in the form of a parallel plate, which is assumed to represent such elements, is disposed between the lens system and the image plane Sim.

This zoom lens consists essentially of five lens groups consisting of, in order from the object side along the optical axis Z, a first lens group G1 having a positive refractive power, a second lens group G2 having a positive refractive power, a third lens group G3 having a negative refractive power, a fourth lens group G4, and a fifth lens group G5 having a positive refractive power. An aperture stop St may be disposed, for example, between the fourth lens group G4 and the fifth lens group G5 and on the object side and in the vicinity of the fifth lens group G5. It should be noted that the aperture stop St shown in FIGS. 1 and 2 does not necessarily represent the size and the shape thereof, but represents the position thereof along the optical axis.

In the example shown in FIG. 1, the first lens group G1 consists of nine lenses, i.e., lenses L11 to L19 in this order from the object side, the second lens group G2 consists of one lens, i.e., lens L21, the third lens group G3 consists of five lenses, i.e., lenses L31 to L35 in this order from the object side, the fourth lens group G4 consists of two lenses, i.e., lenses L41 to L42 in this order from the object side, and the fifth lens group G5 consists of twelve lenses, i.e., lenses L51 to L62 in this order from the object side. Further, the first lens group G1 consists essentially of three lens groups consisting of, in order from the object side, a first lens-group front group G1a having a negative refractive power, a first lens-group middle group G1b having a positive refractive power, and a first lens-group rear group G1c having a positive refractive power. In the example shown in FIG. 1, the first lens-group front group G1a consists of the lenses L11 to L13, the first lens-group middle group G1b consists of the lenses L14 to L16, and the first lens-group rear group G1c consists of the lenses L17 to L19.

During magnification change from the wide-angle end to the telephoto end, the first lens group G1 and the fifth lens group G5 are fixed relative to the image plane Sim, and the second lens group G2, the third lens group G3, and the fourth lens group G4 are moved along the optical axis direction to change distances between the lens groups. The curved arrows shown in FIG. 1 below the second lens group G2, the third lens group G3, and the fourth lens group G4, respectively, schematically show movement loci of the corresponding lens groups during magnification change from the wide-angle end to the telephoto end.

In this zoom lens, the most object-side first lens group G1 is a positive lens group, and this allows reduction of the entire length of the lens system and thus is advantageous for size reduction. Further, the most image-side fifth lens group G5 is a positive lens group. This allows suppressing increase of the incidence angle of the principal ray of off-axis rays on the image plane Sim, thereby suppressing shading.

The second lens group G2 has a positive refractive power and is a moving group that is moved during magnification change. This allows suppressing the effective diameter of the first lens group G1 at the telephoto side and suppressing the outside diameter of the first lens group G1, thereby achieving size reduction and weight reduction. In particular, cameras such as motion-picture cameras and broadcasting cameras are required to be portable, and it is effective to reduce the size and weight of the first lens group G1, which otherwise tends to have a large lens diameter and a heavy weight. In this zoom lens, magnification change is effected mainly by the third lens group G3. Disposing the second lens group G2 that has a positive refractive power between the third lens group and the first lens group G1 which is fixed during magnification change and moving the second lens group G2 during magnification change allows suppressing change of spherical aberration during magnification change, and maintaining good performance during magnification change while achieving a high magnification lens system.

The third lens group G3 that is a negative lens group allows effecting magnification change mainly by the third lens group G3. The fourth lens group G4 may, for example, be a negative lens group. In the case where the fourth lens group G4 is a negative lens group, magnification change can be effected by the third lens group G3 and the fourth lens group G4 working in cooperation, and this allows suppressing change of aberrations during magnification change. Further, in the case where the fourth lens group G4 is a negative lens group, a space required for movement of the lens groups that are moved during magnification change is smaller, and this allows suppressing the entire length of the lens system while achieving a high magnification lens system.

It is preferred that, in this zoom lens, the position of the second lens group G2 at the telephoto end be on the image side of the position of the second lens group G2 at the wide-angle end. This allows suppressing the effective diameter of the first lens group G1 and suppressing the outside diameter of the first lens group G1, thereby achieving size reduction and weight reduction.

It is preferred that, in this zoom lens, the position of the third lens group G3 at the telephoto end be on the image side of the position of the third lens group G3 at the wide-angle end. This is advantageous for achieving a high magnification.

It is preferred that, in this zoom lens, the fourth lens group have a negative refractive power, and the position of the fourth lens group G4 at the telephoto end be on the image side of the position of the fourth lens group G4 at the wide-angle end. This allows effecting magnification change by the third lens group G3 and the fourth lens group G4 working in cooperation, while suppressing change of aberrations during magnification change.

In the example shown in FIG. 1, the second lens group G2 is always moved toward the image side and is not moved toward the object side during magnification change from the wide-angle end to the telephoto end, the third lens group G3 is always moved toward the image side and is not moved toward the object side during magnification change from the wide-angle end to the telephoto end, and the fourth lens group G4 is once moved toward the object side and then is moved toward the image side during magnification change from the wide-angle end to the telephoto end.

It is preferred that, during focusing from an object at infinity to a close object of this zoom lens, the first lens-group front group G1a and the first lens-group rear group G1c be fixed relative to the image plane Sim, and only the first lens-group middle group G1b be moved along the optical axis direction. This configuration allows suppressing change of aberrations and change of angle of view during focusing. In FIG. 1, the straight arrow in the horizontal direction is shown below the first lens-group middle group G1b to denote that the first lens-group middle group G1b is a focus group.

The first lens-group front group G1a may consist of, in order from the object side, a negative lens, and a cemented lens formed by a negative lens and a positive lens that are cemented together in this order from the object side, for example. The first lens-group middle group G1b may consist of, in order from the object side, a positive lens, a negative lens, and a positive lens, or consist of, in order from the object side, a positive lens, a positive lens, a negative lens, and a positive lens, for example. The first lens-group rear group G1c may consist of three positive single lenses, may consist of two positive single lenses, or may consist of a negative lens, a positive lens, a positive lens, and a positive lens in this order from the object side, for example.

The second lens group G2 may consist of one positive lens with a convex surface toward the object side, for example. This configuration is advantageous for achieving size reduction and weight reduction. The fourth lens group G4 may consist of, in order from the object side, a negative lens and a positive lens, for example. More particularly, the fourth lens group G4 may consist of a cemented lens formed by a biconcave lens and a positive meniscus lens that are cemented together in this order from the object side. This configuration is advantageous for suppressing change of chromatic aberration during magnification change.

It is preferred that this zoom lens satisfy one of or any combination of the condition expressions (1) to (5) below:

$$5 < f2/fw \quad (1),$$

$$0.005 < \Delta G2m/(TL \times Zr) < 0.050 \quad (2),$$

$$TL/Y < 40 \quad (3),$$

$$1.75 < Nd31 \quad (4), \text{ and}$$

$$-10 < f4/fw < -1 \quad (5),$$

where f2 is a focal length of the second lens group, f4 is a focal length of the fourth lens group, fw is a focal length of the entire system at the wide-angle end, ΔG2m is a positional difference along the optical axis between the position of the second lens group at the wide-angle end and the position of the second lens group at the telephoto end, TL is a distance along the optical axis from the most object-side surface of the first lens group to the image plane, Zr is a zoom ratio, Y is a maximum image height, and Nd31 is a refractive index with respect to the d-line of the most object-side lens of the third lens group.

When the zoom lens is configured to satisfy the lower limit of the condition expression (1), the refractive power of the second lens group G2 can be suppressed and this is advantageous for successful correction of spherical aberration. It is more preferred that the zoom lens satisfy the condition expression (1-1) below:

$$10 < f2/fw < 50 \quad (1-1).$$

The zoom lens satisfying the lower limit of the condition expression (1-1) is more advantageous for successful correction of spherical aberration. When the zoom lens is configured to satisfy the upper limit of the condition expression (1-1), the refractive power of the second lens group G2 can be ensured, and increase of the lens diameter of the first lens group G1 can be suppressed.

The "ΔG2m" in the condition expression (2) is an amount of movement of the second lens group G2 when magnification is changed from the wide-angle end to the telephoto end. When the zoom lens is configured to satisfy the lower limit of the condition expression (2), increase of spherical aberration at the intermediate range of the zoom range can be suppressed. When the zoom lens is configured to satisfy the upper limit of the condition expression (2), increase of the lens diameter of the first lens group G1 can be suppressed. In order to enhance the above-described effects with respect to the condition expression (2), it is more preferred that the condition expression below (2-1) be satisfied:

$$0.010 < \Delta G2m/(TL \times Zr) < 0.020 \quad (2-1).$$

The "TL" in the condition expression (3) is an entire length of the lens system. When the zoom lens is configured to satisfy the upper limit of the condition expression (3), the entire length of the lens system can be suppressed while accommodating a large image size. In order to enhance the above-described effects with respect to the condition expression (3), it is more preferred that the condition expression (3-1) below be satisfied:

$$TL/Y < 32 \quad (3-1).$$

The condition expression (4) relates to a refractive index of the most object-side lens of the third lens group G3. In this zoom lens, magnification change is mainly effected by the third lens group G3. Selecting the material to satisfy the lower limit of the condition expression (4) is advantageous for correction of field curvature, in particular, for suppressing change of field curvature during magnification change. In order to enhance the above-described effects with respect to the condition expression (4), it is more preferred that the condition expression (4-1) below be satisfied:

$$1.80 < Nd31 \quad (4-1).$$

When the zoom lens is configured to satisfy the lower limit of the condition expression (5), the refractive power of the fourth lens group G4 can be ensured. This can suppress the amount of movement of the fourth lens group G4, thereby suppressing the entire length of the lens system. It should be noted that, when the condition expression (5) is satisfied, the fourth lens group G4 is a negative lens group and works in cooperation with the third lens group G3 to effect magnification change. Therefore, satisfying the lower limit of the condition expression (5) allows avoiding the refractive power of the third lens group G3 from becoming excessively strong and increasing change of aberrations during magnification change.

When the zoom lens is configured to satisfy the upper limit of the condition expression (5), the refractive power of the fourth lens group G4 can be suppressed. This allows avoiding over correction of spherical aberration and is advantageous for successful correction of spherical aberration. Further, when the zoom lens is configured to satisfy the upper limit of the condition expression (5), the refractive power of the fourth lens group G4 can be suppressed. This allows preventing the back focus from becoming excessively long and suppressing the entire length of the lens system. In order to enhance the above-described effects with respect to the condition expression (5), it is more preferred that the condition expression (5-1) below be satisfied:

$$-7<f4/fw<-3 \tag{5-1}$$

The zoom lens according to the above-described embodiment is preferably applicable to a lens system having a zoom ratio of around 10×, for example. The number of lenses and the shapes of the lenses forming each lens group of the zoom lens of the invention are not limited to those in the example shown in FIG. 1, and lenses of different numbers and shapes may be used to form each lens group. Further, the above-described preferred configurations and possible configurations can be combined in any manner, and it is preferred that the above-described configurations be selectively adopted, as appropriate, depending on required specifications of the zoom lens.

Now, two preferred aspects of the zoom lens of the invention and advantageous effects thereof are described. It should be noted that each of the two preferred aspects can adapt the above-described preferred and possible configurations, as appropriate.

The first aspect of the zoom lens consists essentially of five lens groups consisting of, in order from the object side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power, wherein, during magnification change from the wide-angle end to the telephoto end, the first lens group G1 and the fifth lens group G5 are fixed relative to the image plane Sim, and the second lens group G2, the third lens group G3, and the fourth lens group G4 are moved along the optical axis direction to change distances between the lens groups. According to the first aspect, the effective diameter of the first lens group G1 at the telephoto side can be suppressed, and the entire length of the lens system can be suppressed. The first aspect also allows suppressing change of spherical aberration during magnification change, and this allows maintaining good performance during magnification change while achieving a high magnification lens system.

The second aspect of the zoom lens consists essentially of five lens groups consisting of, in order from the object side, a first lens group G1 having a positive refractive power, a second lens group G2 having a positive refractive power, a third lens group G3 having a negative refractive power, a fourth lens group G4, and a fifth lens group G5 having a positive refractive power, wherein, during magnification change from the wide-angle end to the telephoto end, the first lens group G1 and the fifth lens group G5 are fixed relative to the image plane Sim, and the second lens group G2, the third lens group G3, and the fourth lens group G4 are moved along the optical axis direction to change distances between the lens groups, and wherein the above-described condition expression (1) is satisfied. According to the second aspect, the effective diameter of the first lens group G1 at the telephoto side can be suppressed. Further, change of spherical aberration during magnification change can be suppressed, and this allows maintaining good performance during magnification change while achieving a high magnification lens system.

Next, specific numerical examples of the zoom lens of the invention are described. Examples 1 to 6 shown below are normalized such that the focal length of the entire system at the wide-angle end in each example becomes 10.00.

Example 1

Figure 3:
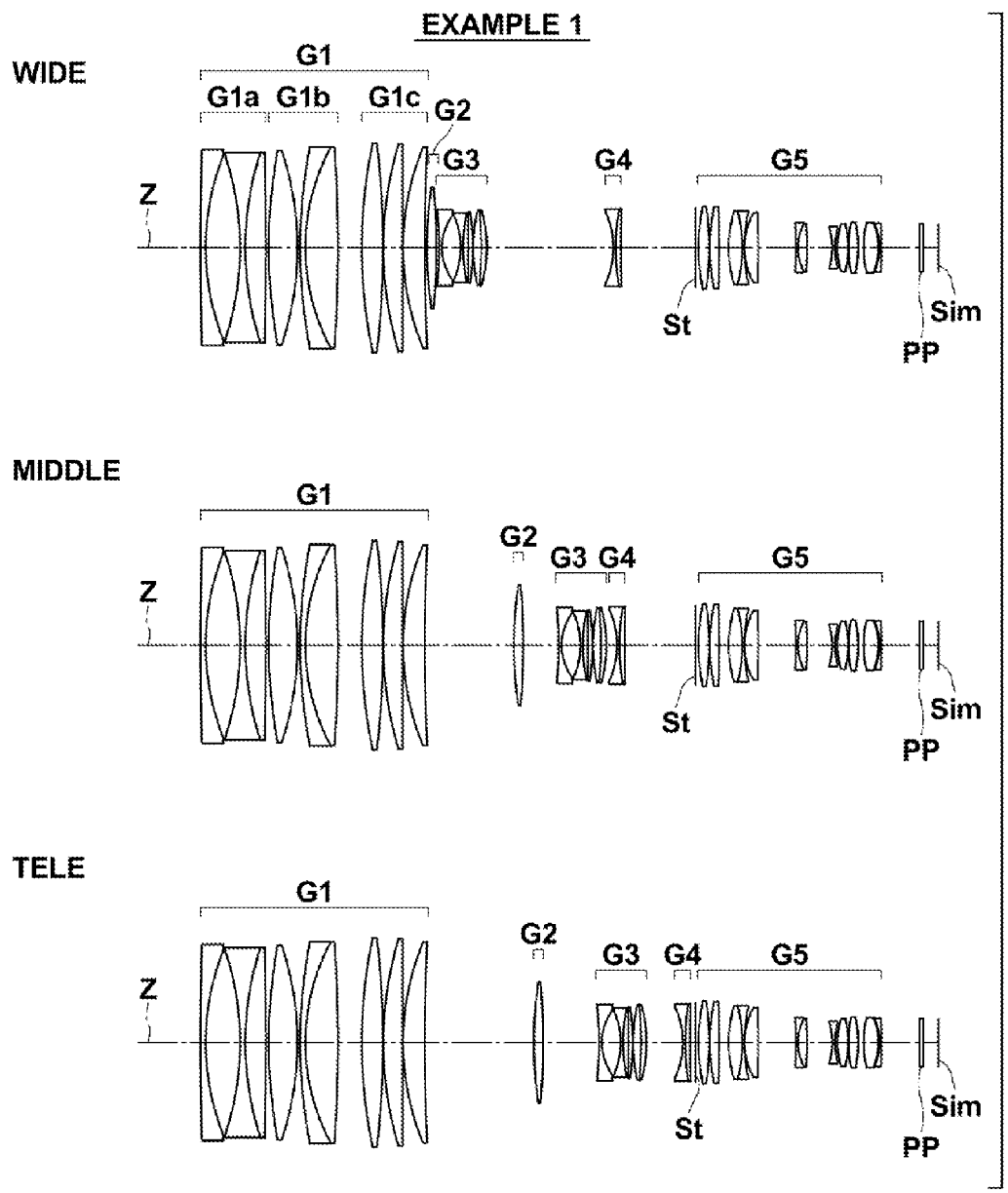
FIG. 3 is a sectional view illustrating the lens configuration of a zoom lens of Example 1 of the invention, where the state at the wide-angle end is shown at the top, the state at the middle focal length is shown at the middle, and the state at the telephoto end is shown at the bottom.

FIG. 3 is a sectional view illustrating the lens configuration of a zoom lens of Example 1 when the zoom lens is focused on an object at infinity. In FIG. 3, the state at the wide-angle end is shown at the top denoted by the text "WIDE", the state at the middle focal length is shown at the middle denoted by the text "MIDDLE", and the state at the telephoto end is shown at the bottom denoted by the text "TELE". On FIG. 3, the left side is the object side, and the right side is the image side.

The schematic configuration of the zoom lens of Example 1 is as follows. The zoom lens of Example 1 consists essentially of five lens groups consisting of in order from the object side, a first lens group G1 having a positive refractive power, a second lens group G2 having a positive refractive power, a third lens group G3 having a negative refractive power, a fourth lens group G4 having a negative refractive power, an aperture stop St, and a fifth lens group G5 having a positive refractive power. During magnification change from the wide-angle end to the telephoto end, the first lens group G1 and the fifth lens group G5 are fixed relative to the image plane Sim, and the second lens group G2, the third lens group G3, and the fourth lens group G4 are moved along the optical axis direction to change distances between the adjacent lens groups. The first lens group G1 consists essentially of three lens groups consisting of, in order from the object side, a first lens-group front group G1a having a negative refractive power, a first lens-group middle group G1b having a positive refractive power, and a first lens-group rear group G1c having a positive refractive power. During focusing from an object at infinity to a close object, only the first lens-group middle group G1b is moved along the optical axis direction. It should be noted that, in the example shown in FIG. 3, an optical member PP which is assumed to represent various filters, a cover glass, etc., is disposed between the fifth lens group G5 and the image plane Sim.

As the detailed configuration of the zoom lens of Example 1, Table 1 shows basic lens data, Table 2 shows specifications with respect to the d-line and variable surface distances, and Table 3 shows aspheric coefficients. The numerical values shown in the tables below are rounded at predetermined decimal places.

In Table 1, each value in the column of "Si" represents the surface number of the i-th (i=1, 2, 3, . . . ) surface, where the object-side surface of the most object side element is the 1st surface and the number is sequentially incremented toward the image side, each value in the column of "Ri" represents the radius of curvature of the i-th surface, and each value in the column of "Di" represents the surface distance between the i-th surface and the i+1-th surface along the optical axis Z. It should be noted that the lowermost numerical value shown in the column of "Di" is the surface distance between the most image-side surface shown in Table 1 and the image plane Sim along the optical axis Z. Further, in Table 1, each value in the column of "Ndj" represents the refractive index with respect to the d-line (the wavelength of 587.56 nm) of the j-th (j=1, 2, 3, . . . ) element, where the most object-side element is the 1st element and the number is sequentially incremented toward the image side, and each value in the column of "vdj" represents the Abbe number with respect to the d-line of the j-th element.

The sign with respect to the radius of curvature shown in Table 1 is provided such that a positive radius of curvature indicates a surface shape that is convex toward the object side, and a negative radius of curvature indicates a surface shape that is convex toward the image side. Table 1 also shows the aperture stop St and the optical member PP, and the surface number and the text "(St)" are shown at the position in the column of the surface number corresponding to the aperture stop St.

With respect to the surface distances that are changed during focusing, Table 1 shows a value of each surface distance when the zoom lens is focused on an object at infinity and the text "(inf)" following each value. Further, in Table 1, the value of each surface distance that is changed during magnification change is represented by the symbol "DD[ ]", where the surface number of the object-side surface corresponding to each surface distance is shown within "[ ]". Specifically, DD[16], DD[18], DD[27], and DD[30] shown in Table 1 represent the variable surface distances that are changed during magnification change, and correspond to the distance between the first lens group G1 and the second lens group G2, the distance between the second lens group G2 and the third lens group G3, the distance between the third lens group G3 and the fourth lens group G4, and the distance between the fourth lens group G4 and the aperture stop St, respectively.

Table 2 shows values of specifications with respect to the d-line and the variable surface distances at the wide-angle end, at the middle focal length (the column of "Middle" in Table 2), and at the telephoto end, respectively. In Table 2, the symbol "f" means the focal length of the entire system, the symbol "Bf" means the back focus (equivalent air distance), the symbol "FNo." means the f-number, and the symbol "2ω" means the total angle of view (the unit of which is degrees).

In Table 1, the symbol "*" is added to the surface number of each aspheric surface, and the numerical value of each aspheric surface shown in the column of radius of curvature is the paraxial radius of curvature of the aspheric surface. Table 3 shows aspheric coefficients of each aspheric surface. In Table 3, the symbol "E−n" (where n is an integer) following the numerical value of each aspheric coefficient means "×10$^{-n}$". The aspheric coefficients are coefficients KA and Am (where m is a natural number and the values thereof vary among the examples) in the formula of aspheric surface shown below, where Σ means a sum with respect to the term "m":

$$Zd = C \cdot h^2 / \{1 + (1 - KA \cdot C^2 \cdot h^2)^{1/2}\} + \Sigma Am \cdot h^m,$$

where Zd is a depth of the aspheric surface (a length of a perpendicular line from a point at a height h on the aspheric surface to a plane tangent to the apex of the aspheric surface and perpendicular to the optical axis), h is the height (a distance from the optical axis to the lens surface), C is a paraxial radius of curvature, and KA and Am are aspheric coefficients (where m=3, 4, 5, . . . ).

TABLE 1

Example 1 - Basic Lens Data

| Si | Ri | Di | Ndj | vdj |
|---|---|---|---|---|
| 1 | 910.4733 | 1.3576 | 1.80400 | 46.58 |
| 2 | 62.9147 | 9.0602 | | |
| 3 | −73.4949 | 1.3649 | 1.77250 | 49.60 |
| 4 | 76.9703 | 5.3870 | 1.84661 | 23.78 |

TABLE 1-continued

Example 1 - Basic Lens Data

| Si | Ri | Di | Ndj | vdj |
|---|---|---|---|---|
| 5 | −929.7691 | 0.7172(inf) | | |
| *6 | 120.9103 | 7.6130 | 1.49700 | 81.54 |
| 7 | −77.2115 | 0.7130 | | |
| 8 | 134.4290 | 1.3649 | 1.80518 | 25.43 |
| 9 | 53.5105 | 8.5332 | 1.43875 | 94.93 |
| 10 | −383.5971 | 6.2635(inf) | | |
| 11 | 127.6922 | 5.5807 | 1.49700 | 81.54 |
| 12 | −223.3450 | 0.1163 | | |
| 13 | 92.2205 | 5.0298 | 1.49700 | 81.54 |
| 14 | 21200.6513 | 0.1160 | | |
| 15 | 65.5239 | 5.7555 | 1.49700 | 81.54 |
| 16 | 548.1694 | DD[16] | | |
| 17 | 101.4554 | 2.4602 | 1.49700 | 81.54 |
| 18 | −170.2207 | DD[18] | | |
| 19 | −92.5578 | 0.7560 | 1.83481 | 42.73 |
| *20 | 13.0068 | 4.9824 | | |
| 21 | −19.8566 | 0.6208 | 1.59282 | 68.63 |
| 22 | 42.3637 | 1.3193 | | |
| 23 | −645.9363 | 1.1939 | 1.73800 | 32.26 |
| 24 | −60.5381 | 0.1160 | | |
| 25 | 42.9907 | 2.1047 | 1.72916 | 54.68 |
| 26 | −97.8151 | 1.4517 | 1.73800 | 32.26 |
| 27 | −34.7104 | DD[27] | | |
| 28 | −21.6236 | 0.6248 | 1.49700 | 81.54 |
| 29 | 56.4131 | 1.3580 | 1.80518 | 25.43 |
| 30 | 493.3671 | DD[30] | | |
| 31(St) | ∞ | 0.7637 | | |
| 32 | 51.4001 | 2.8660 | 1.63476 | 57.24 |
| 33 | −65.0783 | 0.0772 | | |
| 34 | 49.8074 | 2.4336 | 1.64867 | 58.22 |
| 35 | −355.6688 | 2.5247 | | |
| 36 | 31.3636 | 3.5509 | 1.49700 | 81.54 |
| 37 | −38.3687 | 0.5426 | 2.00069 | 25.46 |
| 38 | 37.5557 | 0.0772 | | |
| 39 | 18.1193 | 3.6435 | 1.45000 | 87.43 |
| 40 | −280.2836 | 9.8400 | | |
| 41 | −156.1586 | 0.5427 | 1.91082 | 35.25 |
| 42 | 12.4271 | 2.4132 | 1.92286 | 18.90 |
| 43 | −93.0745 | 6.6369 | | |
| 44 | −16.3209 | 0.7757 | 1.92001 | 32.06 |
| 45 | 21.4995 | 0.6007 | | |
| 46 | 20.2583 | 2.7944 | 1.52442 | 63.45 |
| 47 | −25.7308 | 0.0772 | | |
| 48 | 29.5679 | 2.5181 | 1.49199 | 79.92 |
| 49 | −33.7432 | 1.4751 | | |
| 50 | 25.1793 | 3.8789 | 1.48999 | 60.69 |
| 51 | −16.9802 | 0.3169 | | |
| 52 | −15.1949 | 0.5039 | 1.80518 | 25.42 |
| 53 | −154.8332 | 10.0000 | | |
| 54 | ∞ | 1.0000 | 1.51633 | 64.14 |
| 55 | ∞ | 3.9824 | | |

TABLE 2

Example 1 - Specifications and Variable Surface Distances

| | Wide-Angle | Middle | Telephoto |
|---|---|---|---|
| Zoom Ratio | 1.0 | 3.5 | 9.6 |
| f | 10.00 | 35.30 | 96.00 |
| Bf | 14.64 | 14.64 | 14.64 |
| FNo. | 2.60 | 2.60 | 2.60 |
| 2ω[°] | 65.2 | 19.2 | 7.2 |
| DD[16] | 0.5410 | 23.4063 | 28.6436 |
| DD[18] | 0.7128 | 9.2865 | 14.6367 |
| DD[27] | 33.2914 | 2.8259 | 9.4912 |
| DD[30] | 19.6361 | 18.6626 | 1.4098 |

TABLE 3

Example 1 - Aspheric Coefficients

| Surface No. | 6 | 20 |
|---|---|---|
| KA | 1.0000000E+00 | 1.0000000E+00 |
| A4 | −7.7271400E−07 | −4.1534037E−05 |
| A6 | 3.3397897E−10 | −1.8536850E−07 |
| A8 | −8.9001231E−14 | 2.2799299E−10 |
| A10 | 3.3235877E−17 | −9.3000973E−12 |

Figure 9:
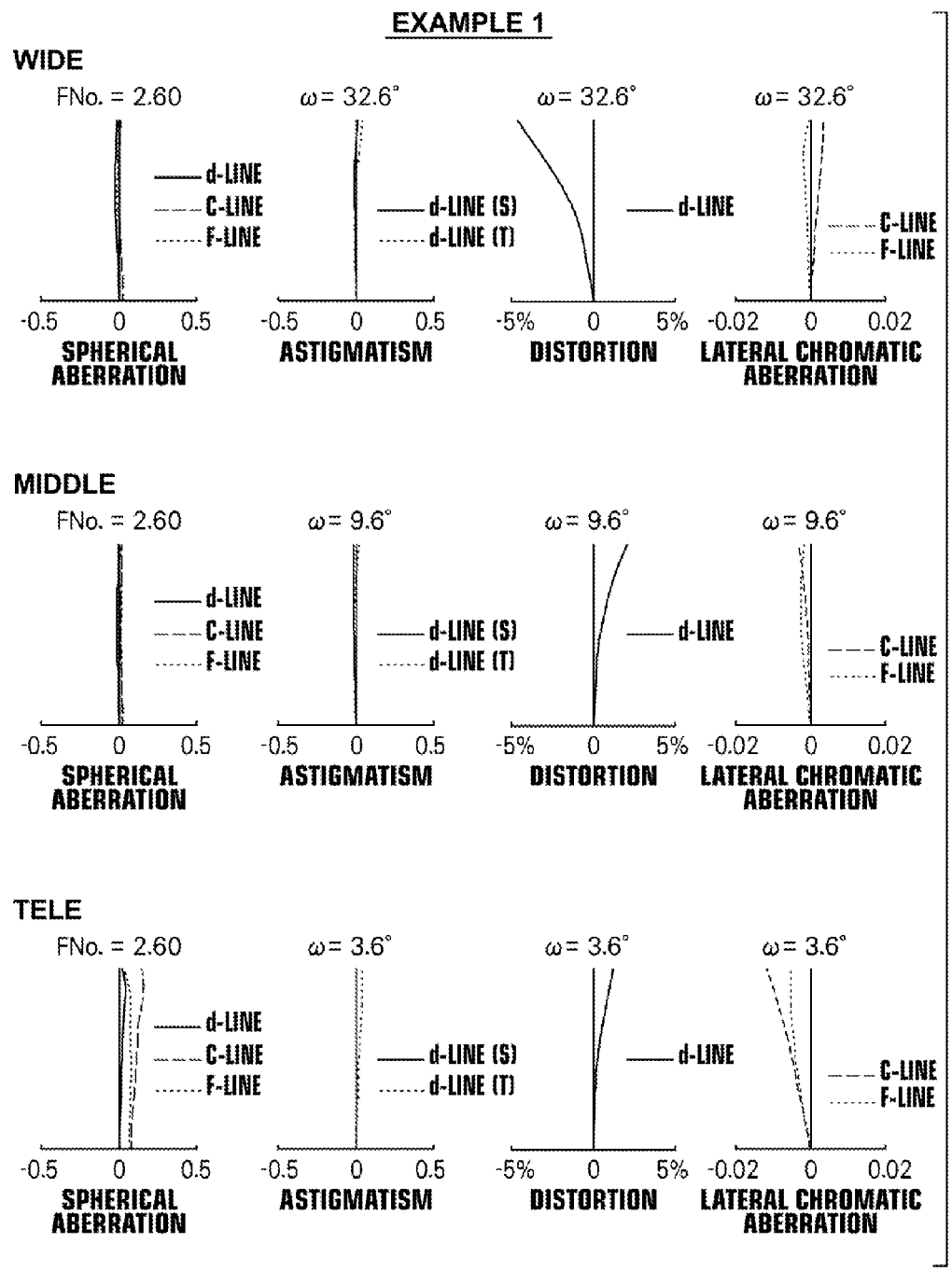
FIG. 9 shows aberration diagrams of the zoom lens of Example 1 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

FIG. 9 shows aberrations of the zoom lens of Example 1, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 9 are those when the zoom lens is focused on an object at infinity, and the aberration diagrams in FIG. 9 show spherical aberration, astigmatism, distortion, and lateral chromatic aberration (chromatic aberration of magnification), in this order from the left, in each state.

In FIG. 9, each diagram of spherical aberration shows spherical aberrations with respect to the d-line (the wavelength of 587.6 nm), the C-line (the wavelength of 656.3 nm), and the F-line (the wavelength of 486.1 nm) in the solid line, the dashed line, and the dotted line, respectively. Each diagram of astigmatism shows astigmatisms with respect to the d-line in the sagittal direction and the tangential direction in the solid line and the dotted line, respectively. Each diagram of distortion shows distortions with respect to the d-line in the solid line. Each diagram of lateral chromatic aberration shows lateral chromatic aberrations with respect to the C-line and the F-line in the dashed line and the dotted line, respectively. The symbol "FNo." in each diagram of spherical aberration means f-number, and the symbol "ω" in the other aberration diagrams means a half value of the maximum total angle of view (i.e., half angle of view) when the zoom lens is focused on an object at infinity.

The symbols, the meanings, and the manners of description of the data explained above with respect to Example 1 also apply to the other examples described below, unless otherwise noted, and the same explanations are not repeated below.

Example 2

Figure 4:
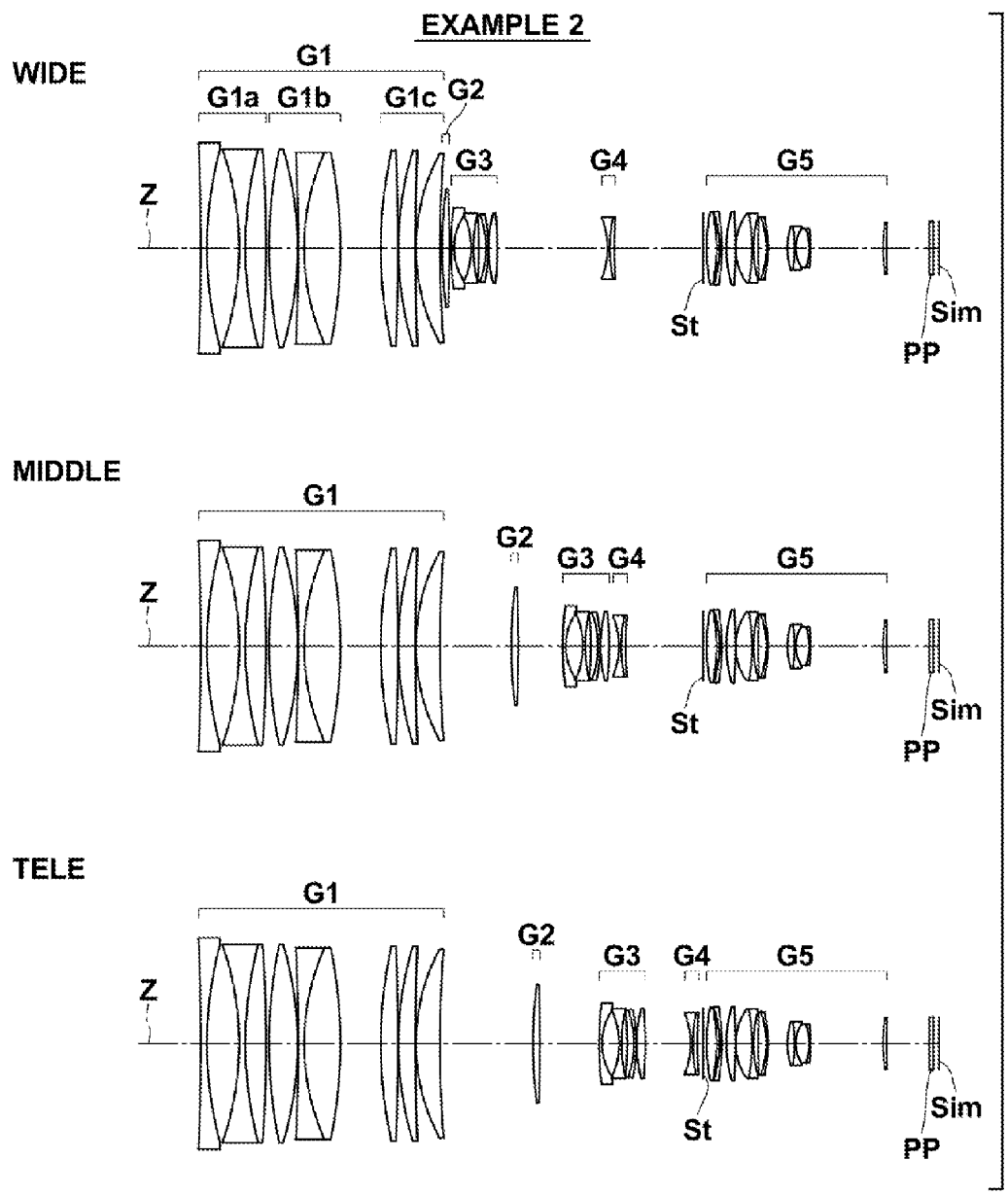
FIG. 4 is a sectional view illustrating the lens configuration of a zoom lens of Example 2 of the invention, where the state at the wide-angle end is shown at the top, the state at the middle focal length is shown at the middle, and the state at the telephoto end is shown at the bottom.

FIG. 4 is a sectional view illustrating the lens configuration of a zoom lens of Example 2 when the zoom lens is focused on an object at infinity. The schematic configuration of the zoom lens of Example 2 is the same as that of Example 1. Tables 4, 5, and 6 show, as the specific configuration of the zoom lens of Example 2, basic lens data, specifications and variable surface distances, and aspheric coefficients, respectively. In Table 6, "−" is shown, in place of a numerical value, where no aspheric coefficient is present, which will also apply to the tables showing aspheric coefficients of the examples described later.

TABLE 4

Example 2 - Basic Lens Data

| Si | Ri | Di | Ndj | νdj |
|---|---|---|---|---|
| 1 | −585.7938 | 1.4738 | 1.83481 | 42.73 |
| 2 | 86.0448 | 7.5699 | | |
| 3 | −67.3108 | 1.4435 | 1.77250 | 49.60 |
| 4 | 88.1383 | 4.8436 | 1.84666 | 23.83 |
| 5 | −312.7147 | 0.7407(inf) | | |
| 6 | 109.8651 | 6.6925 | 1.49700 | 81.61 |
| 7 | −78.0946 | 0.1357 | | |
| 8 | −471.7048 | 1.3962 | 1.73800 | 32.26 |
| 9 | 53.1364 | 8.5241 | 1.49700 | 81.61 |
| 10 | −106.0973 | 9.4422(inf) | | |
| *11 | 93.6763 | 4.0844 | 1.49700 | 81.61 |
| 12 | −501.2646 | 0.1160 | | |
| 13 | 76.0198 | 3.9638 | 1.49700 | 81.61 |
| 14 | 544.2952 | 0.1160 | | |
| 15 | 44.8427 | 5.6915 | 1.49700 | 81.61 |
| 16 | 280.7773 | DD[16] | | |
| 17 | 103.9924 | 1.6295 | 1.43875 | 94.93 |
| 18 | −399.9718 | DD[18] | | |
| *19 | 87.7394 | 0.6789 | 2.00069 | 25.46 |
| 20 | 13.3446 | 4.0445 | | |
| 21 | −18.0761 | 0.5429 | 1.59282 | 68.63 |
| 22 | 31.7688 | 1.3103 | | |
| 23 | −91.2901 | 1.6509 | 1.84666 | 23.83 |
| 24 | −21.5482 | 0.5082 | 1.83481 | 42.73 |
| 25 | −39.8908 | 0.1163 | | |
| 26 | 31.5030 | 2.0510 | 1.73800 | 32.26 |
| 27 | −71.6387 | DD[27] | | |
| 28 | −18.0834 | 0.5084 | 1.49700 | 81.61 |
| 29 | 31.4631 | 1.0859 | 1.80518 | 25.43 |
| 30 | 90.9560 | DD[30] | | |
| 31(St) | ∞ | 0.7639 | | |
| 32 | 43.0932 | 2.3691 | 1.71430 | 38.90 |
| 33 | −38.0319 | 0.6626 | | |
| 34 | −25.4548 | 0.5428 | 1.80518 | 25.42 |
| 35 | −47.6279 | 1.0474 | | |
| 36 | 28.6917 | 2.1197 | 1.48749 | 70.23 |
| 37 | −154.8466 | 0.0777 | | |
| 38 | 13.5855 | 3.8567 | 1.43875 | 94.93 |
| 39 | −41.9313 | 0.3879 | 1.90366 | 31.32 |
| 40 | 26.6885 | 1.1420 | | |
| 41 | 513.3134 | 1.8246 | 1.84666 | 23.83 |
| 42 | −20.5915 | 0.3918 | 1.83481 | 42.73 |
| 43 | −31.3412 | 4.5516 | | |
| 44 | 16.5292 | 1.6440 | 1.53775 | 74.70 |
| 45 | −37.6609 | 0.3101 | 1.88300 | 40.80 |
| 46 | 8.1264 | 0.0384 | | |
| 47 | 8.1424 | 3.1323 | 1.43875 | 94.93 |
| 48 | −12.7091 | 0.3100 | 1.77250 | 49.60 |
| 49 | −50.2838 | 17.0836 | | |
| 50 | 43.5921 | 0.8099 | 1.62004 | 36.26 |
| 51 | 171.3495 | 10.0000 | | |
| 52 | ∞ | 1.0000 | 1.51633 | 64.14 |
| 53 | ∞ | 1.2835 | | |

TABLE 5

Example 2 - Specifications and Variable Surface Distances

| | Wide-Angle | Middle | Telephoto |
|---|---|---|---|
| Zoom Ratio | 1.0 | 3.9 | 11.6 |
| f | 10.00 | 39.02 | 116.00 |
| Bf | 11.94 | 11.94 | 11.94 |
| FNo. | 3.31 | 3.31 | 3.65 |
| 2ω[°] | 65.2 | 17.4 | 6.0 |
| DD[16] | 0.5145 | 16.7223 | 21.8396 |
| DD[18] | 0.4348 | 10.4818 | 13.8785 |
| DD[27] | 25.8741 | 2.2919 | 10.6206 |
| DD[30] | 20.9272 | 18.2547 | 1.4119 |

TABLE 6

Example 2 - Aspheric Coefficients

| Surface No. | 11 | 19 |
|---|---|---|
| KA | 1.0000000E+00 | 1.0000000E+00 |
| A3 | 0.0000000E+00 | — |
| A4 | −7.6647637E−07 | 1.8953299E−05 |
| A5 | −2.4538576E−09 | — |
| A6 | 1.0521674E−10 | −6.5152821E−08 |
| A7 | −9.4774025E−13 | — |
| A8 | −3.3855753E−13 | 1.4147902E−10 |
| A9 | 1.2479742E−14 | — |
| A10 | −1.4447757E−16 | −1.0171619E−12 |

Figure 10:
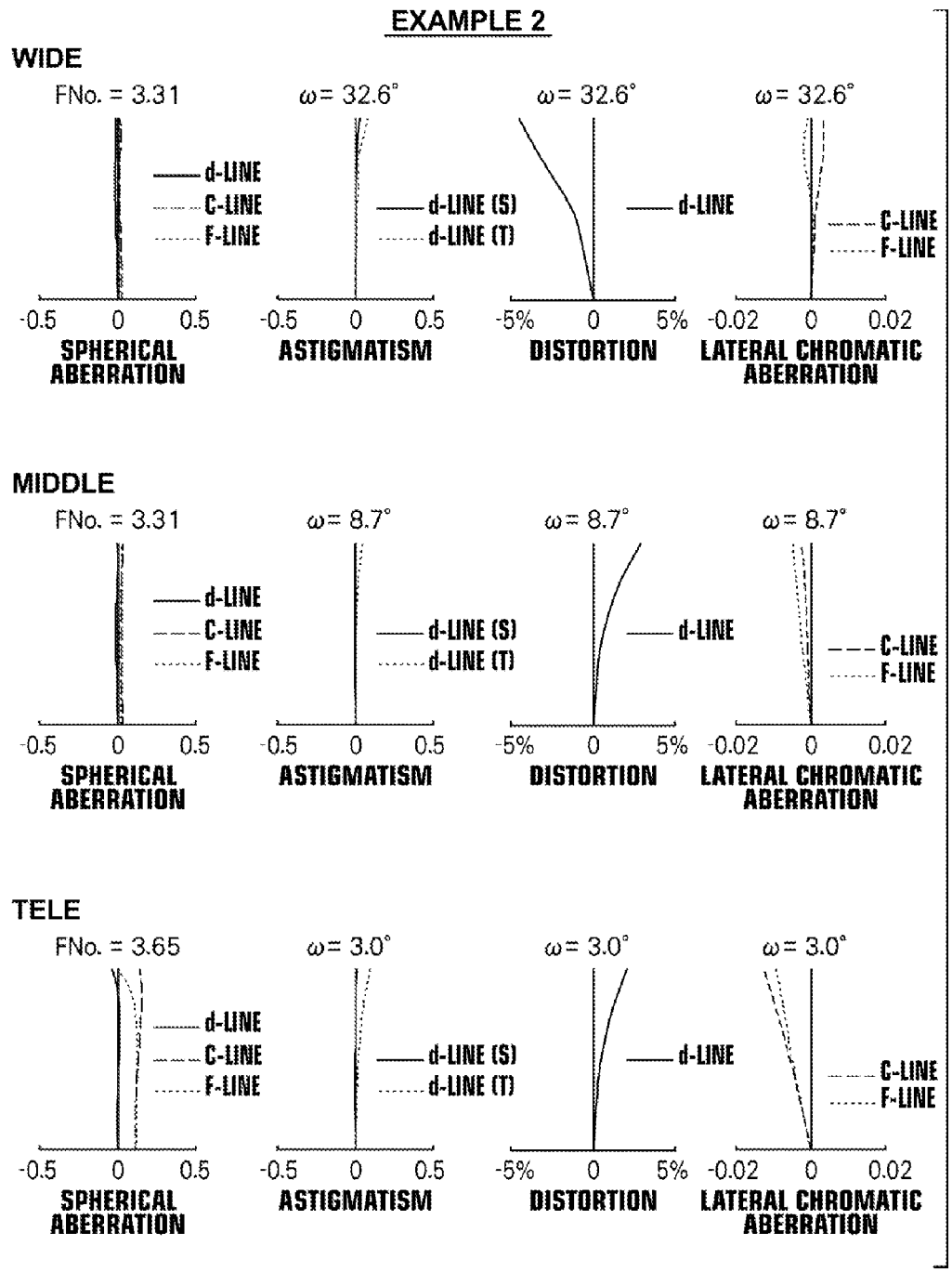
FIG. 10 shows aberration diagrams of the zoom lens of Example 2 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

FIG. 10 shows aberrations of the zoom lens of Example 2, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 10 are those when the zoom lens is focused on an object at infinity, and the aberration diagrams in FIG. 10 show spherical aberration, astigmatism, distortion, and lateral chromatic aberration (chromatic aberration of magnification), in this order from the left, in each state.

Example 3

Figure 5:
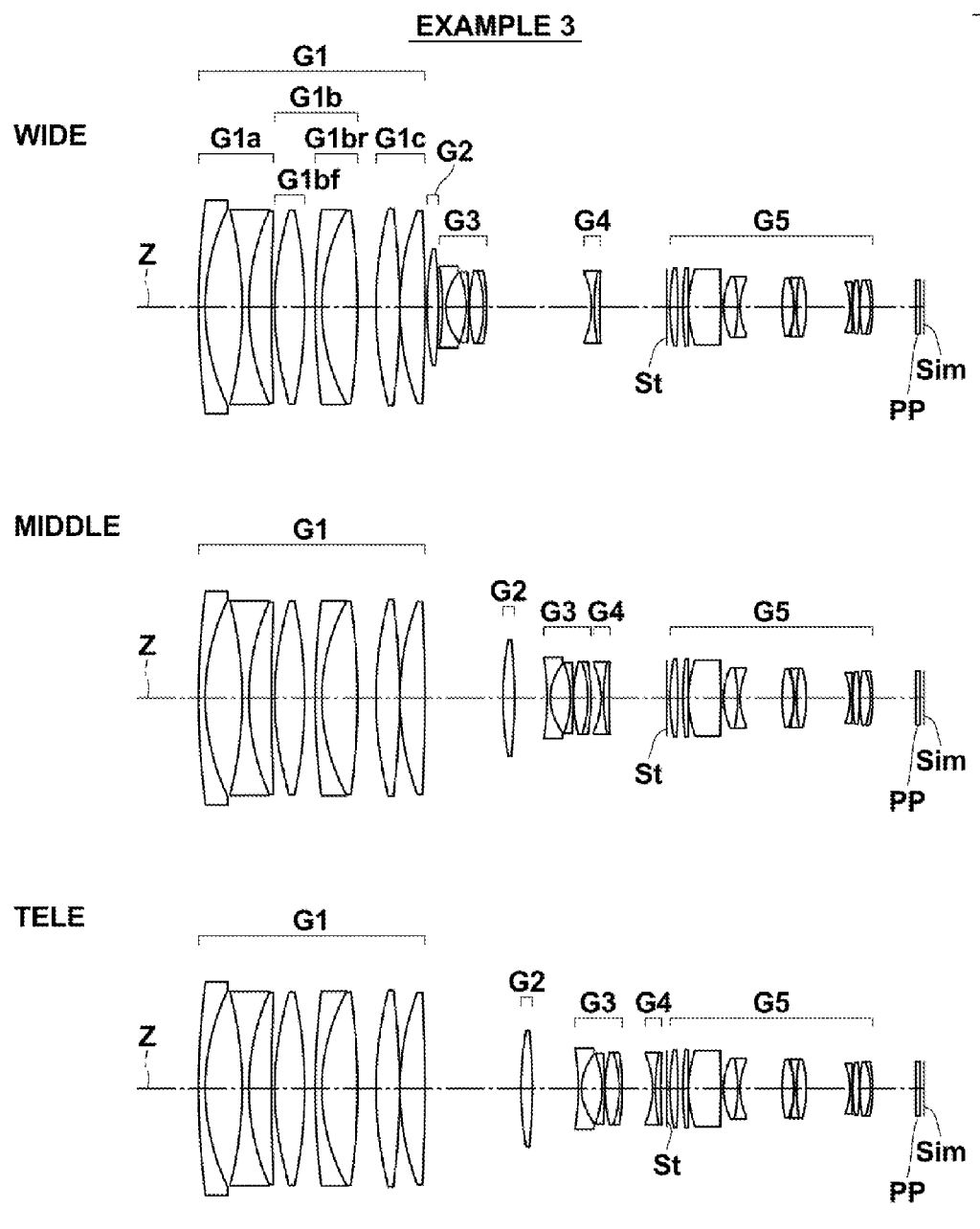
FIG. 5 is a sectional view illustrating the lens configuration of a zoom lens of Example 3 of the invention, where the state at the wide-angle end is shown at the top, the state at the middle focal length is shown at the middle, and the state at the telephoto end is shown at the bottom.

FIG. 5 is a sectional view illustrating the lens configuration of a zoom lens of Example 3 when the zoom lens is focused on an object at infinity. The schematic configuration of the zoom lens of Example 3 is almost similar to that of Example 1, except that, in the zoom lens of Example 3, the first lens-group middle group G1b consists of two lens groups, i.e., a first lens-group middle-group front part G1bf and a first lens-group middle-group rear part G1br, where, during focusing, the first lens-group middle-group front part G1bf and the first lens-group middle-group rear part G1br are moved along the optical axis direction to change a distance between these two lens groups. Tables 7, 8, and 9 show basic lens data, specifications and variable surface distances, and aspheric coefficients of the zoom lens of Example 3

TABLE 7

Example 3 - Basic Lens Data

| Si | Ri | Di | Ndj | vdj |
|---|---|---|---|---|
| 1 | 182.0921 | 1.5509 | 1.80400 | 46.58 |
| 2 | 50.4243 | 8.6052 | | |
| 3 | −86.5130 | 1.5582 | 1.77250 | 49.60 |
| 4 | 53.4000 | 5.2407 | 1.84661 | 23.78 |
| 5 | 465.1676 | 0.7332(inf) | | |
| *6 | 64.1959 | 6.9877 | 1.49700 | 81.54 |
| 7 | −102.1682 | 2.4336(inf) | | |
| 8 | 169.0477 | 1.5510 | 1.80518 | 25.43 |
| 9 | 44.7788 | 8.2530 | 1.43875 | 94.93 |
| 10 | −164.5358 | 4.3557(inf) | | |
| 11 | 89.8596 | 5.4329 | 1.59282 | 68.63 |
| 12 | −176.6030 | 0.1160 | | |
| 13 | 61.2353 | 5.7744 | 1.59282 | 68.63 |
| 14 | −413.0078 | DD[14] | | |
| 15 | 71.3313 | 2.6456 | 1.49700 | 81.54 |
| 16 | −128.7966 | DD[16] | | |
| 17 | −56.3916 | 0.7556 | 1.83481 | 42.73 |
| *18 | 10.8954 | 4.7375 | | |
| 19 | −21.3948 | 0.6200 | 1.49700 | 81.54 |
| 20 | −108.9337 | 0.1159 | | |
| 21 | 33.1005 | 3.3067 | 1.73800 | 32.26 |
| 22 | −24.5198 | 0.6975 | 1.74320 | 49.34 |
| 23 | −46.4871 | DD[23] | | |

TABLE 7-continued

Example 3 - Basic Lens Data

| Si | Ri | Di | Ndj | vdj |
|---|---|---|---|---|
| 24 | −18.4086 | 0.6245 | 1.49700 | 81.54 |
| 25 | 41.9882 | 1.2853 | 1.80518 | 25.43 |
| 26 | 168.1652 | DD[26] | | |
| 27(St) | ∞ | 0.7634 | | |
| 28 | 48.2035 | 1.8377 | 1.74320 | 49.34 |
| 29 | −119.5672 | 1.1633 | | |
| 30 | 75.0805 | 1.2400 | 1.74320 | 49.34 |
| 31 | −3009.0040 | 0.0778 | | |
| 32 | 25.1933 | 7.4581 | 1.58913 | 61.14 |
| 33 | −348.2512 | 0.6621 | | |
| 34 | 15.2170 | 3.2645 | 1.49700 | 81.54 |
| 35 | −32.1011 | 0.5815 | 2.00069 | 25.46 |
| 36 | 14.6817 | 9.7742 | | |
| 37 | 31.8662 | 2.7329 | 1.49700 | 81.54 |
| 38 | −16.9694 | 0.1104 | | |
| 39 | −22.0756 | 0.5424 | 1.91082 | 35.25 |
| 40 | 41.9577 | 2.2357 | 1.92286 | 18.90 |
| 41 | −24.8104 | 10.1541 | | |
| 42 | −14.1424 | 0.5428 | 1.84661 | 23.78 |
| 43 | −384.3566 | 0.0772 | | |
| 44 | 40.0185 | 1.5703 | 1.48749 | 70.23 |
| 45 | −51.4119 | 0.0772 | | |
| 46 | 33.3304 | 2.4625 | 1.43875 | 94.93 |
| 47 | −17.3834 | 0.5427 | 1.80518 | 25.42 |
| 48 | −31.8885 | 10.0000 | | |
| 49 | ∞ | 1.0000 | 1.51633 | 64.14 |
| 50 | ∞ | 0.9798 | | |

TABLE 8

Example 3 - Specifications and Variable Surface Distances

| | Wide-Angle | Middle | Telephoto |
|---|---|---|---|
| Zoom Ratio | 1.0 | 3.5 | 8.0 |
| f | 10.00 | 35.30 | 80.00 |
| Bf | 11.64 | 11.64 | 11.64 |
| FNo. | 2.65 | 2.65 | 2.65 |
| 2ω[°] | 65.2 | 19.2 | 8.6 |
| DD[14] | 0.5390 | 18.1583 | 22.3598 |
| DD[16] | 0.9504 | 7.6189 | 10.6945 |
| DD[23] | 24.4241 | 2.3113 | 7.0531 |
| DD[26] | 15.5742 | 13.3992 | 1.3803 |

TABLE 9

Example 3 - Aspheric Coefficients

| Surface No. | 6 | 18 |
|---|---|---|
| KA | 1.0000000E+00 | 1.0000000E+00 |
| A4 | −2.6429725E−06 | −6.8406069E−05 |
| A6 | 9.8702394E−10 | −5.7284103E−07 |
| A8 | −2.5538962E−13 | 1.6970587E−09 |
| A10 | 3.6036834E−17 | −5.9410304E−11 |

FIG. 11 shows aberrations of the zoom lens of Example 3, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 11 are those when the zoom lens is focused on an object at infinity, and the aberration diagrams in FIG. 11 show spherical aberration, astigmatism, distortion, and lateral chromatic aberration (chromatic aberration of magnification), in this order from the left, in each state.

Example 4

Figure 6:
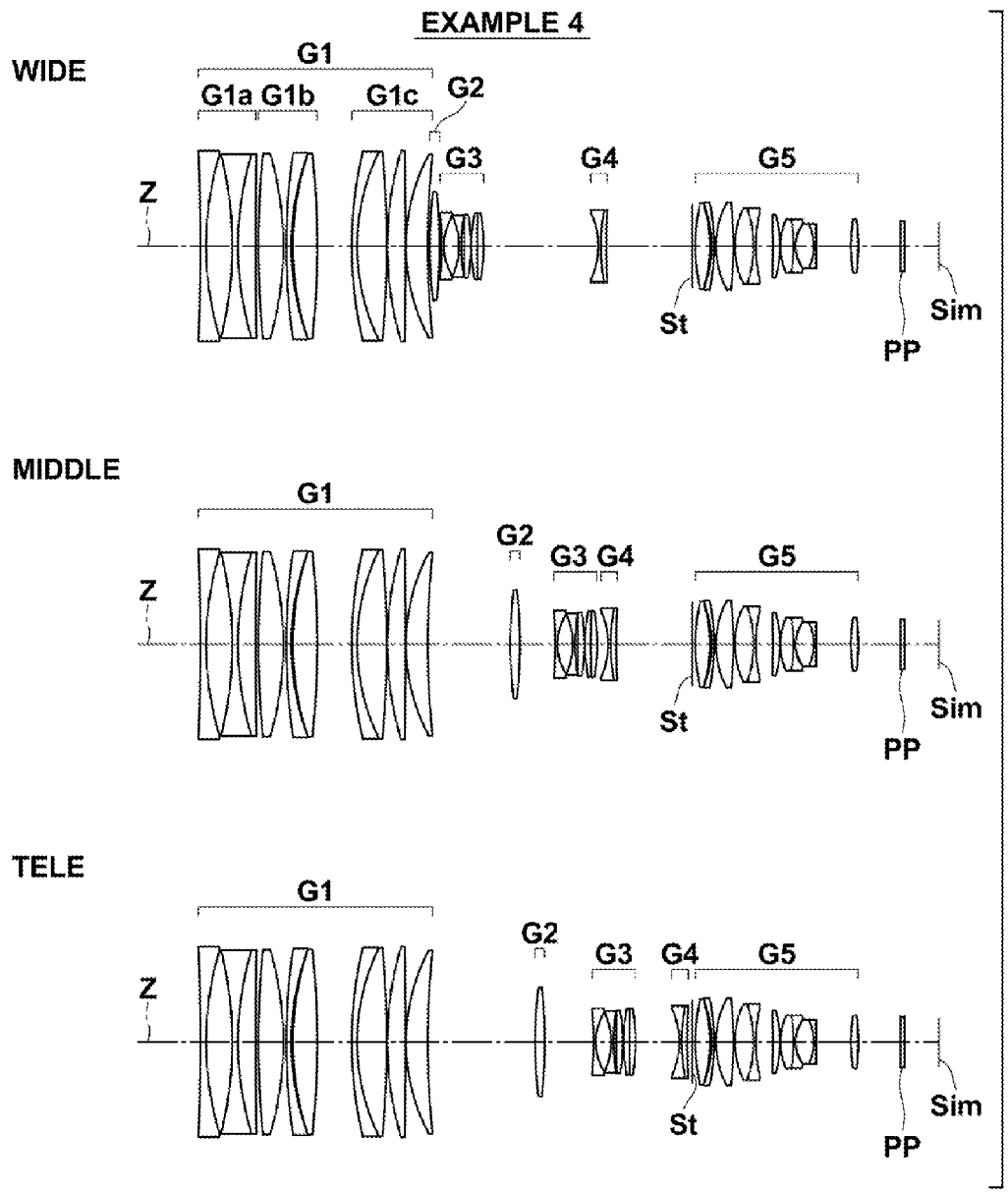
FIG. 6 is a sectional view illustrating the lens configuration of a zoom lens of Example 4 of the invention, where the state at the wide-angle end is shown at the top, the state at the middle focal length is shown at the middle, and the state at the telephoto end is shown at the bottom.

FIG. 6 is a sectional view illustrating the lens configuration of a zoom lens of Example 4 when the zoom lens is focused on an object at infinity. The schematic configuration of the zoom lens of Example 4 is almost similar to that of Example 1. Tables 10, 11, and 12 show basic lens data, specifications and variable surface distances, and aspheric coefficients of the zoom lens of Example 4.

TABLE 10

Example 4 - Basic Lens Data

| Si | Ri | Di | Ndj | vdj |
|---|---|---|---|---|
| 1 | −488.7615 | 1.3709 | 1.83481 | 42.73 |
| 2 | 72.5160 | 6.2102 | | |
| 3 | −86.2451 | 1.3780 | 1.65160 | 58.55 |
| 4 | 72.6338 | 4.2031 | 1.80518 | 25.42 |
| 5 | 1215.4571 | 0.6744(inf) | | |
| 6 | 219.4551 | 5.9260 | 1.43875 | 94.93 |
| 7 | −74.7322 | 0.6662 | | |
| *8 | 143.9813 | 1.2302 | 1.80518 | 25.43 |
| 9 | 61.0448 | 0.3865 | | |
| 10 | 67.4248 | 5.7692 | 1.43875 | 94.93 |
| 11 | −205.5084 | 8.2599(inf) | | |
| 12 | 95.5107 | 1.2309 | 1.77250 | 49.60 |
| 13 | 48.8655 | 7.0561 | 1.49700 | 81.54 |
| 14 | −240.0818 | 0.1052 | | |
| 15 | 75.4043 | 4.3933 | 1.59282 | 68.63 |
| 16 | −1088.3912 | 0.1052 | | |
| 17 | 44.5679 | 5.2025 | 1.48563 | 85.20 |
| 18 | 202.5251 | DD[18] | | |
| 19 | 103.9500 | 2.2696 | 1.43875 | 94.93 |
| 20 | −121.4725 | DD[20] | | |
| 21 | −101.5290 | 0.5623 | 1.83481 | 42.73 |
| *22 | 12.3818 | 3.6432 | | |
| 23 | −16.1631 | 0.5622 | 1.59282 | 68.63 |
| 24 | 42.3082 | 0.6629 | | |
| 25 | 545.5108 | 1.5886 | 1.73800 | 32.26 |
| 26 | −40.7001 | 0.1052 | | |
| 27 | 37.3823 | 1.4119 | 1.72916 | 54.68 |
| 28 | 308.6886 | 1.5134 | 1.73800 | 32.26 |
| 29 | −43.2977 | DD[29] | | |
| 30 | −18.2016 | 0.5657 | 1.49700 | 81.54 |
| 31 | 42.1724 | 1.3205 | 1.80518 | 25.43 |
| 32 | 153.9630 | DD[32] | | |
| 33(St) | ∞ | 0.6923 | | |
| 34 | 43.7133 | 3.5009 | 1.59270 | 35.31 |
| 35 | −31.8391 | 0.3722 | | |
| 36 | −26.6337 | 0.5974 | 1.74000 | 28.30 |
| 37 | −48.6456 | 0.4216 | | |
| 38 | 21.3541 | 4.1286 | 1.58913 | 61.14 |
| 39 | −99.7915 | 0.3655 | | |
| 40 | 20.1415 | 4.4691 | 1.43875 | 94.93 |
| 41 | −26.0934 | 0.5275 | 1.90366 | 31.32 |
| 42 | 33.3046 | 4.0874 | | |
| 43 | −276.7768 | 1.7193 | 1.84666 | 23.83 |
| 44 | −25.4076 | 0.0701 | | |
| 45 | 15.1186 | 3.0300 | 1.43875 | 94.93 |
| 46 | −47.2256 | 0.4919 | 1.88300 | 40.80 |
| 47 | 8.3785 | 0.1074 | | |
| 48 | 8.5017 | 4.3148 | 1.43875 | 94.93 |
| 49 | −11.6212 | 0.4919 | 1.81600 | 46.62 |
| 50 | 432.0760 | 8.3169 | | |
| 51 | 39.3665 | 1.7391 | 1.59270 | 35.31 |
| 52 | −51.0733 | 10.0000 | | |
| 53 | ∞ | 1.0000 | 1.51633 | 64.14 |
| 54 | ∞ | 8.2627 | | |

TABLE 11

Example 4 - Specifications and Variable Surface Distances

| | Wide-Angle | Middle | Telephoto |
|---|---|---|---|
| Zoom Ratio | 1.0 | 3.8 | 11.0 |
| f | 10.00 | 37.89 | 110.00 |
| Bf | 18.92 | 18.92 | 18.92 |
| FNo. | 2.75 | 2.75 | 3.48 |
| 2ω[°] | 60.0 | 16.2 | 5.6 |
| DD[18] | 0.4652 | 19.6198 | 25.5466 |
| DD[20] | 0.4863 | 8.3932 | 11.5961 |
| DD[29] | 27.3155 | 2.6114 | 10.3716 |
| DD[32] | 20.5247 | 18.1673 | 1.2774 |

TABLE 12

Example 4 - Aspheric Coefficients

| Surface No. | 8 | 22 |
|---|---|---|
| KA | 1.0000000E+00 | 1.0000000E+00 |
| A4 | 7.1219693E−08 | −4.6550356E−05 |
| A6 | 1.2940507E−10 | −1.7973210E−07 |
| A8 | −1.6865941E−15 | −5.9390391E−10 |
| A10 | 2.9100678E−17 | −7.7065233E−12 |

Figure 12:
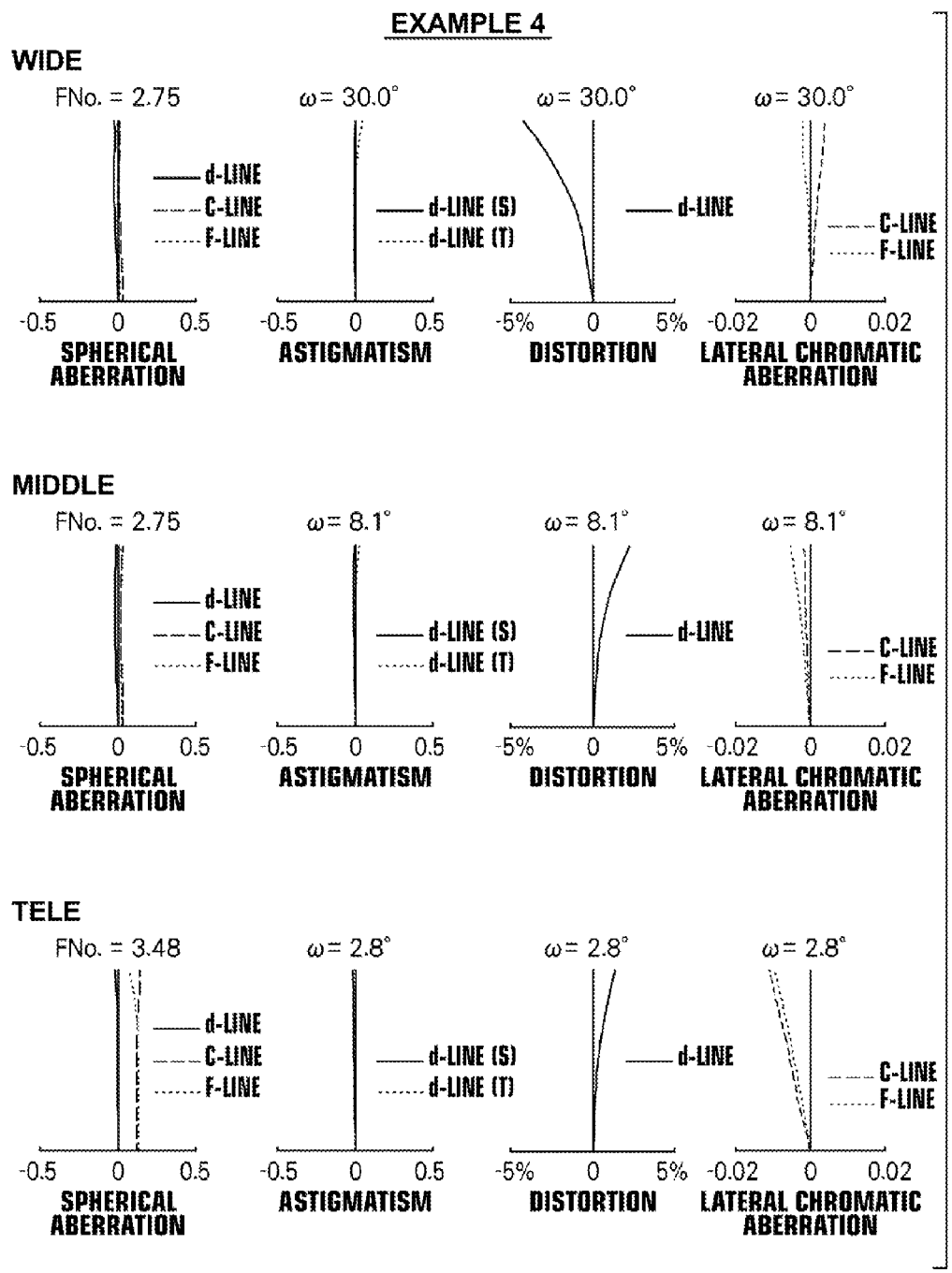
FIG. 12 shows aberration diagrams of the zoom lens of Example 4 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

FIG. 12 shows aberrations of the zoom lens of Example 4, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 12 are those when the zoom lens is focused on an object at infinity, and the aberration diagrams in FIG. 12 show spherical aberration, astigmatism, distortion, and lateral chromatic aberration (chromatic aberration of magnification), in this order from the left, in each state.

Example 5

Figure 7:
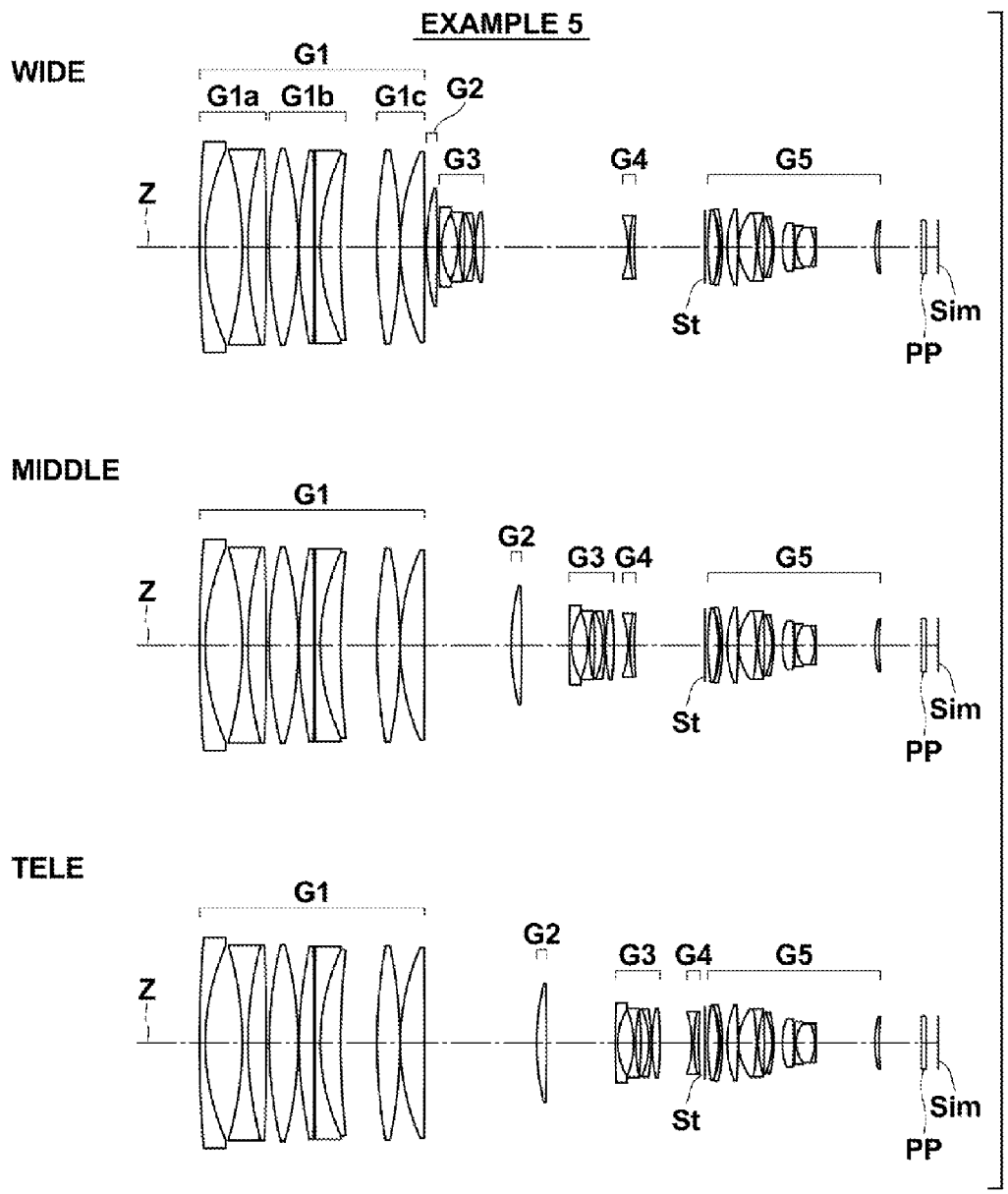
FIG. 7 is a sectional view illustrating the lens configuration of a zoom lens of Example 5 of the invention, where the state at the wide-angle end is shown at the top, the state at the middle focal length is shown at the middle, and the state at the telephoto end is shown at the bottom.

FIG. 7 is a sectional view illustrating the lens configuration of a zoom lens of Example 5 when the zoom lens is focused on an object at infinity. The schematic configuration of the zoom lens of Example 5 is almost similar to that of Example 1. Tables 13, 14, and 15 show basic lens data, specifications and variable surface distances, and aspheric coefficients of the zoom lens of Example 5.

TABLE 13

Example 5 - Basic Lens Data

| Si | Ri | Di | Ndj | vdj |
|---|---|---|---|---|
| 1 | 295.5111 | 1.3646 | 1.83481 | 42.73 |
| 2 | 54.1297 | 8.7236 | | |
| 3 | −77.9219 | 1.3256 | 1.77250 | 49.60 |
| 4 | 85.0752 | 4.3304 | 1.84666 | 23.83 |
| 5 | −694.2948 | 0.7006(inf) | | |
| 6 | 95.3744 | 6.7952 | 1.49700 | 81.61 |
| 7 | −84.5676 | 0.1946 | | |
| *8 | 88.7345 | 3.6163 | 1.48749 | 70.23 |
| 9 | −1941.5308 | 0.1946 | | |
| 10 | 4112.0950 | 1.2866 | 1.73800 | 32.26 |
| 11 | 49.6098 | 4.8064 | 1.49700 | 81.61 |
| 12 | 195.7899 | 8.5494(inf) | | |
| 13 | 124.6742 | 5.4165 | 1.59282 | 68.63 |
| 14 | −107.5161 | 0.1166 | | |
| 15 | 54.0895 | 5.7036 | 1.49700 | 81.61 |
| 16 | −1742.3686 | DD[16] | | |
| 17 | 55.4299 | 2.4178 | 1.43700 | 95.10 |

TABLE 13-continued

Example 5 - Basic Lens Data

| Si | Ri | Di | Ndj | vdj |
|---|---|---|---|---|
| 18 | −468.7459 | DD[18] | | |
| *19 | 215.9389 | 0.5848 | 2.00069 | 25.46 |
| 20 | 14.7645 | 3.7784 | | |
| 21 | −19.4500 | 0.4679 | 1.59282 | 68.63 |
| 22 | 36.9438 | 1.1960 | | |
| 23 | −91.7134 | 1.9510 | 1.84666 | 23.83 |
| 24 | −18.3549 | 0.5263 | 1.83481 | 42.73 |
| 25 | −48.2088 | 0.1166 | | |
| 26 | 34.6993 | 1.9176 | 1.73800 | 32.26 |
| 27 | −76.3073 | DD[27] | | |
| 28 | −20.7939 | 0.4679 | 1.49700 | 81.61 |
| 29 | 36.1327 | 1.0952 | 1.80809 | 22.76 |
| 30 | 89.3082 | DD[30] | | |
| 31(St) | ∞ | 0.7681 | | |
| 32 | 56.5205 | 2.4420 | 1.71430 | 38.90 |
| 33 | −31.8960 | 0.5071 | | |
| 34 | −23.2250 | 0.5068 | 1.80518 | 25.42 |
| 35 | −37.1957 | 1.0527 | | |
| 36 | 23.8666 | 2.6320 | 1.48749 | 70.23 |
| 37 | −101.6084 | 0.0780 | | |
| 38 | 12.5622 | 4.1912 | 1.43875 | 94.93 |
| 39 | −45.1260 | 0.4484 | 1.90366 | 31.32 |
| 40 | 22.4231 | 1.4469 | | |
| 41 | −195.1277 | 1.7562 | 1.84666 | 23.83 |
| 42 | −17.9820 | 0.4289 | 1.83481 | 42.73 |
| 43 | −30.4402 | 2.0335 | | |
| 44 | 16.0466 | 2.6869 | 1.49700 | 81.61 |
| 45 | −94.9212 | 0.2726 | | |
| 46 | −580.7749 | 0.3509 | 1.88300 | 40.80 |
| 47 | 7.1507 | 4.3558 | 1.43875 | 94.93 |
| 48 | −10.6523 | 0.3116 | 1.77250 | 49.60 |
| 49 | −191.6367 | 13.9243 | | |
| 50 | 23.9771 | 0.9904 | 1.62004 | 36.26 |
| 51 | 61.9044 | 10.0000 | | |
| 52 | ∞ | 1.0000 | 1.51633 | 64.14 |
| 53 | ∞ | 2.9273 | | |

TABLE 14

Example 5 - Specifications and Variable Surface Distances

| | Wide-Angle | Middle | Telephoto |
|---|---|---|---|
| Zoom Ratio | 1.0 | 3.9 | 11.6 |
| f | 10.00 | 39.02 | 116.00 |
| Bf | 13.59 | 13.59 | 13.59 |
| FNo. | 3.31 | 3.31 | 3.65 |
| 2ω[°] | 65.8 | 17.4 | 6.0 |
| DD[16] | 0.4936 | 20.4543 | 26.4231 |
| DD[18] | 0.5033 | 11.2245 | 16.1690 |
| DD[27] | 33.9988 | 3.3267 | 7.5887 |
| DD[30] | 16.6039 | 16.5941 | 1.4189 |

TABLE 15

Example 5 - Aspheric Coefficients

| Surface No. | 8 | 19 |
|---|---|---|
| KA | 1.0000000E+00 | 1.0000000E+00 |
| A3 | 0.0000000E+00 | — |
| A4 | −1.4156714E−06 | 1.1380915E−05 |
| A5 | −1.9247466E−09 | — |
| A6 | 1.8575993E−10 | −5.1401174E−08 |
| A7 | −2.3682617E−12 | — |
| A8 | −9.9008006E−14 | 1.5082225E−11 |
| A9 | 2.3167775E−15 | — |
| A10 | 2.2428271E−17 | −2.0205926E−13 |

Figure 13:
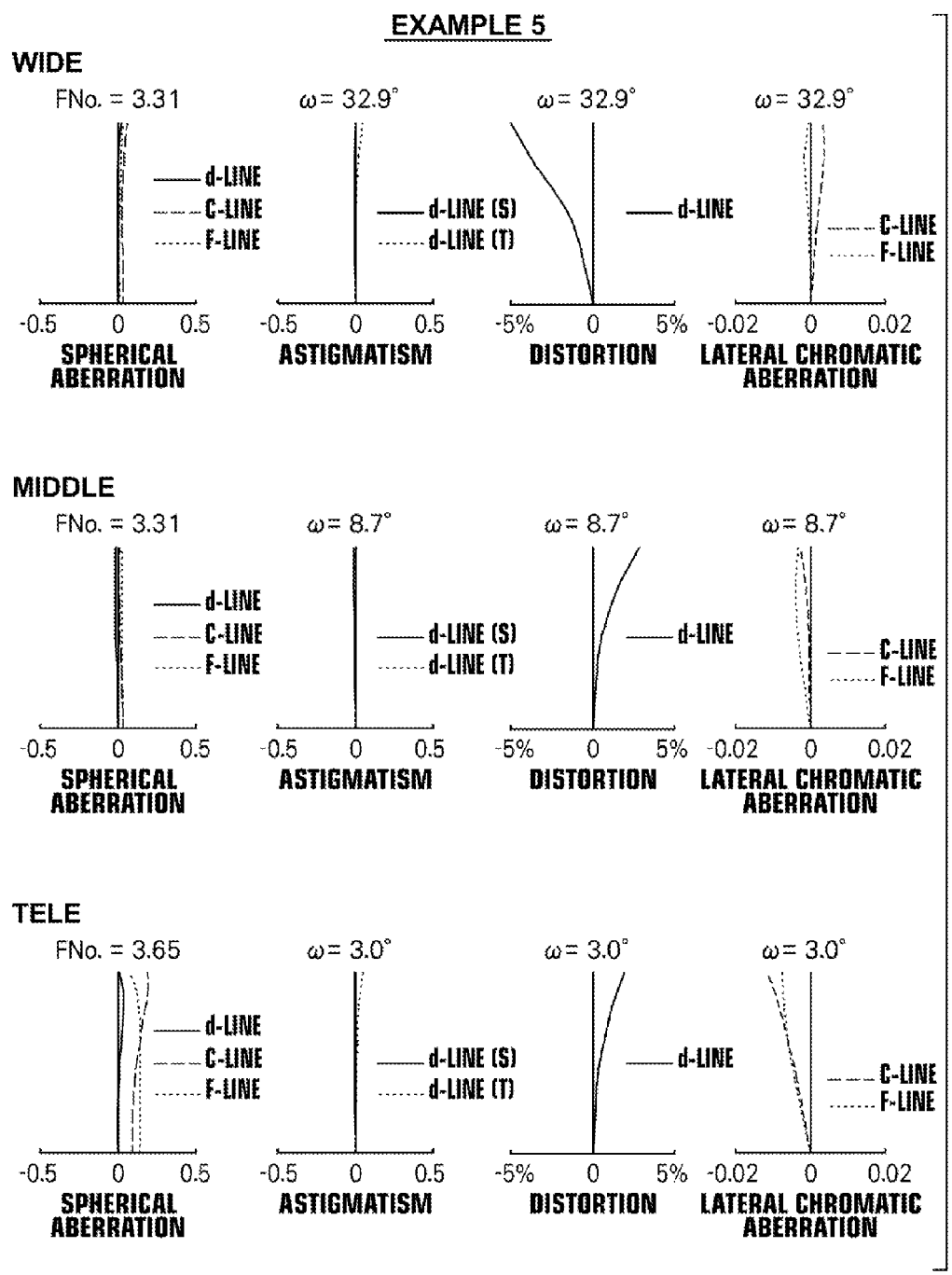
FIG. 13 shows aberration diagrams of the zoom lens of Example 5 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

FIG. 13 shows aberrations of the zoom lens of Example 5, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 13 are those when the zoom lens is focused on an object at infinity, and the aberration diagrams in FIG. 13 show spherical aberration, astigmatism, distortion, and lateral chromatic aberration (chromatic aberration of magnification), in this order from the left, in each state.

Example 6

Figure 8:
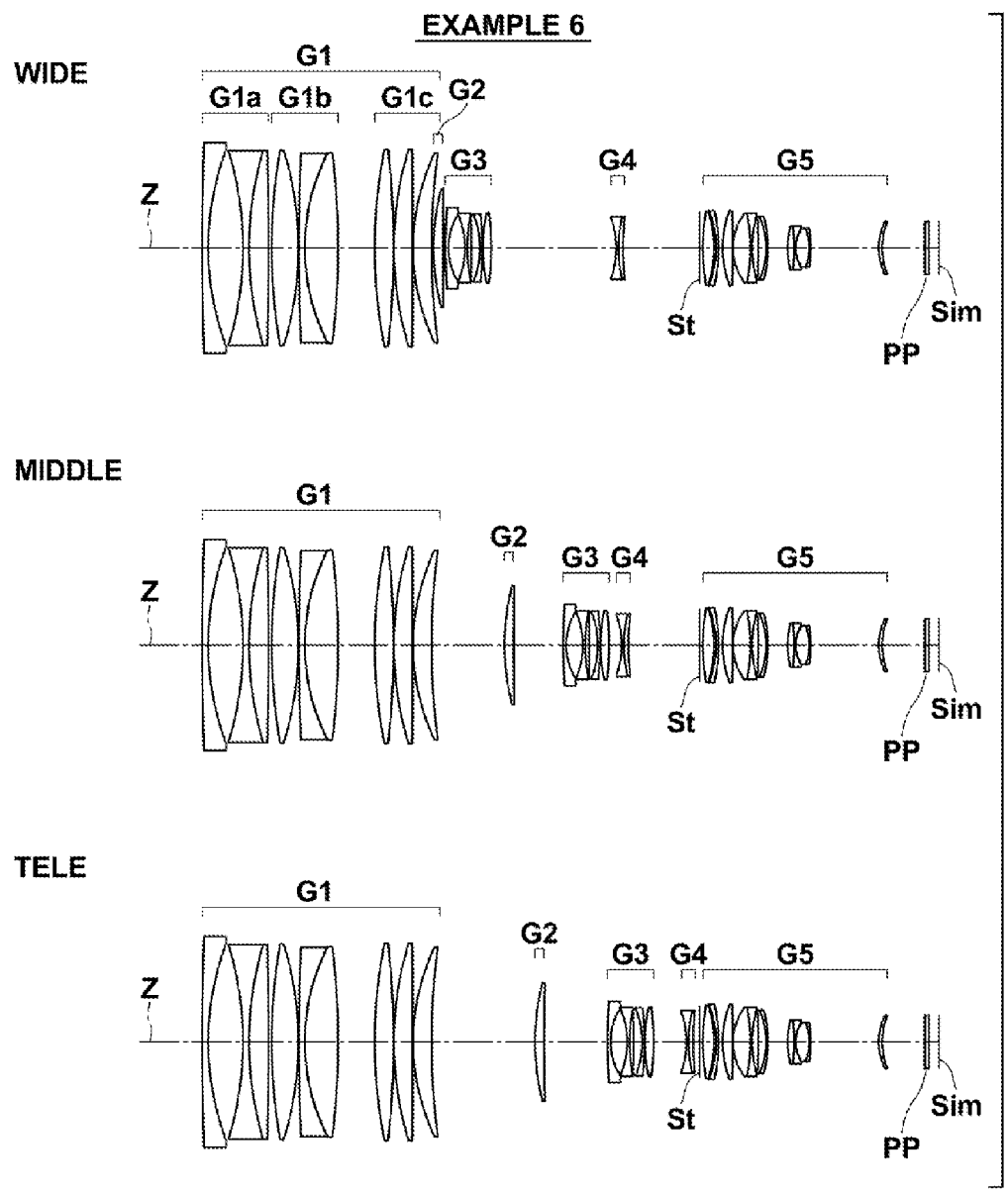
FIG. 8 is a sectional view illustrating the lens configuration of a zoom lens of Example 6 of the invention, where the state at the wide-angle end is shown at the top, the state at the middle focal length is shown at the middle, and the state at the telephoto end is shown at the bottom.

FIG. 8 is a sectional view illustrating the lens configuration of a zoom lens of Example 6 when the zoom lens is focused on an object at infinity. the schematic configuration of the zoom lens of Example 6 is almost similar to that of Example 1. Tables 16, 17, and 18 show basic lens data, specifications and variable surface distances, and aspheric coefficients of the zoom lens of Example 6.

TABLE 16

Example 6 - Basic Lens Data

| Si | Ri | Di | Ndj | vdj |
|---|---|---|---|---|
| 1 | 634.3680 | 1.4777 | 1.83481 | 42.73 |
| 2 | 63.4981 | 8.1685 | | |
| 3 | −74.9513 | 1.4466 | 1.77250 | 49.60 |
| 4 | 77.7318 | 4.6222 | 1.84666 | 23.83 |
| 5 | −856.6895 | 0.7377(inf) | | |
| 6 | 131.8221 | 6.2833 | 1.49700 | 81.61 |
| 7 | −75.4596 | 0.1186 | | |
| *8 | 540.7531 | 1.3999 | 1.73800 | 32.26 |
| 9 | 47.5336 | 0.0385 | | |
| 10 | 47.5380 | 7.7831 | 1.49700 | 81.61 |
| 11 | −182.5153 | 8.6945(inf) | | |
| 12 | 114.7987 | 4.4060 | 1.49700 | 81.61 |
| 13 | −203.3839 | 0.1166 | | |
| 14 | 77.1101 | 4.4170 | 1.49700 | 81.61 |
| 15 | −2198.2316 | 0.1168 | | |
| 16 | 50.0294 | 4.3612 | 1.49700 | 81.61 |
| 17 | 166.9152 | DD[17] | | |
| 18 | 53.3256 | 2.1948 | 1.43875 | 94.93 |
| 19 | 1186.4436 | DD[19] | | |
| *20 | 147.0342 | 0.6807 | 2.00069 | 25.46 |
| 21 | 14.1672 | 3.9538 | | |
| 22 | −19.0708 | 0.5444 | 1.59282 | 68.63 |
| 23 | 38.2958 | 0.9563 | | |
| 24 | −329.5402 | 2.0450 | 1.84666 | 23.83 |
| 25 | −20.1867 | 0.5057 | 1.83481 | 42.73 |
| 26 | −81.4890 | 0.1168 | | |
| 27 | 35.7262 | 2.0478 | 1.73800 | 32.26 |
| 28 | −58.1442 | DD[28] | | |
| 29 | −20.1212 | 0.5092 | 1.49700 | 81.61 |
| 30 | 29.0008 | 1.0887 | 1.80518 | 25.43 |
| 31 | 65.7410 | DD[31] | | |
| 32(St) | ∞ | 0.7665 | | |
| 33 | 50.7754 | 2.5443 | 1.71430 | 38.90 |
| 34 | −28.7262 | 0.5315 | | |
| 35 | −22.4986 | 0.5444 | 1.80518 | 25.42 |
| 36 | −42.2732 | 1.0502 | | |
| 37 | 24.2848 | 2.3472 | 1.48749 | 70.23 |
| 38 | −250.5216 | 0.0774 | | |
| 39 | 13.1898 | 4.0980 | 1.43875 | 94.93 |
| 40 | −37.6040 | 0.3891 | 1.90366 | 31.32 |
| 41 | 25.5823 | 1.4103 | | |
| 42 | −162.5073 | 1.9505 | 1.84666 | 23.83 |
| 43 | −16.7947 | 0.3890 | 1.83481 | 42.73 |
| 44 | −26.5533 | 4.6689 | | |
| 45 | 20.2146 | 1.5301 | 1.53775 | 74.70 |
| 46 | −37.3150 | 0.3108 | 1.88300 | 40.80 |
| 47 | 8.1189 | 0.0385 | | |

TABLE 16-continued

Example 6 - Basic Lens Data

| Si | Ri | Di | Ndj | vdj |
|----|-----|-----|-----|-----|
| 48 | 8.1450 | 3.2059 | 1.43875 | 94.93 |
| 49 | −11.9012 | 0.3113 | 1.77250 | 49.60 |
| 50 | −33.3999 | 16.0558 | | |
| 51 | 12.9456 | 0.8597 | 1.62004 | 36.26 |
| 52 | 16.0867 | 10.0000 | | |
| 53 | ∞ | 1.0000 | 1.51633 | 64.14 |
| 54 | ∞ | 2.4142 | | |

TABLE 17

Example 6 - Specifications and Variable Surface Distances

| | Wide-Angle | Middle | Telephoto |
|---|---|---|---|
| Zoom Ratio | 1.0 | 3.9 | 11.6 |
| f | 10.00 | 39.02 | 116.00 |
| Bf | 13.07 | 13.07 | 13.07 |
| FNo. | 3.30 | 3.30 | 3.64 |
| 2ω[°] | 65.4 | 17.4 | 6.0 |
| DD[17] | 0.4634 | 17.1730 | 24.3714 |
| DD[19] | 0.5776 | 11.6673 | 14.9271 |
| DD[28] | 29.4526 | 2.9315 | 7.7609 |
| DD[31] | 18.1098 | 16.8316 | 1.5440 |

TABLE 18

Example 6 - Aspheric Coefficients

| Surface No. | 8 | 20 |
|---|---|---|
| KA | 1.0000000E+00 | 1.0000000E+00 |
| A3 | 0.0000000E+00 | — |
| A4 | −6.5230827E−08 | 1.0080230E−05 |
| A5 | −3.1543414E−09 | — |
| A6 | 2.9267208E−10 | −5.0092923E−08 |
| A7 | 2.0231003E−12 | — |
| A8 | −8.3891951E−13 | 7.2800572E−11 |
| A9 | 4.1157776E−14 | — |
| A10 | −6.5990030E−16 | −5.2568731E−13 |

Figure 14:
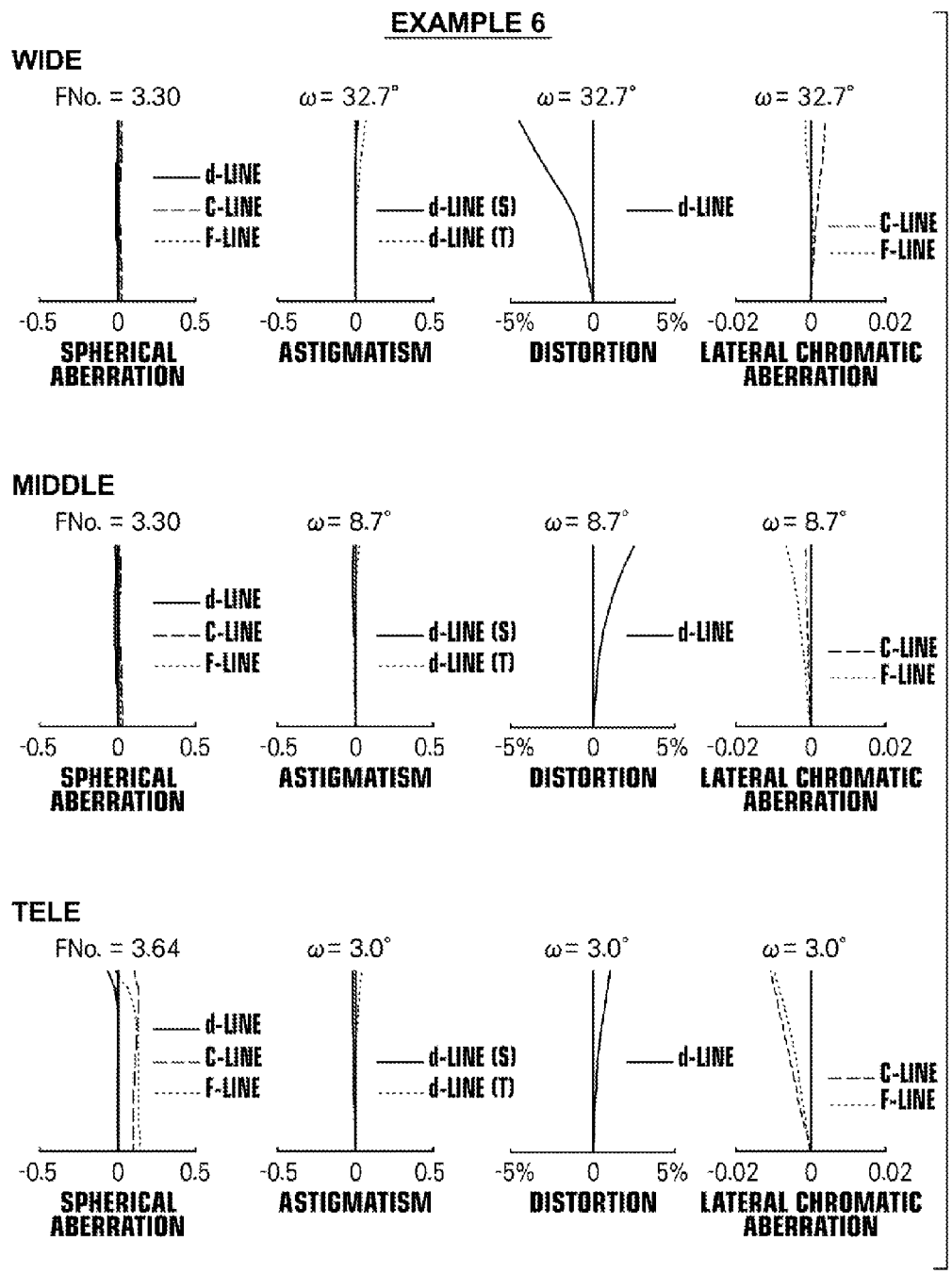
FIG. 14 shows aberration diagrams of the zoom lens of Example 6 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

FIG. 14 shows aberrations of the zoom lens of Example 6, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 14 are those when the zoom lens is focused on an object at infinity, and the aberration diagrams in FIG. 14 show spherical aberration, astigmatism, distortion, and lateral chromatic aberration (chromatic aberration of magnification), in this order from the left, in each state.

Table 19 shows values corresponding to and relating to the condition expressions (1) to (5) of the zoom lenses of Examples 1 to 6.

TABLE 19

| | Example 1 | Example 2 | Example 3 | Example 4 | Example 5 | Example 6 |
|---|---|---|---|---|---|---|
| ΔG2m | 28.102 | 21.324 | 21.821 | 25.082 | 25.930 | 23.907 |
| fw | 10.000 | 10.000 | 10.000 | 10.000 | 10.000 | 10.000 |
| f2 | 128.288 | 188.297 | 92.775 | 128.063 | 113.588 | 127.184 |
| f4 | −52.252 | −37.557 | −40.842 | −39.554 | −40.939 | −37.824 |
| TL | 193.976 | 173.462 | 168.719 | 175.872 | 174.356 | 173.929 |
| Y | 6.109 | 6.110 | 6.106 | 5.538 | 6.141 | 6.126 |
| Nd31 | 1.83481 | 2.00069 | 1.83481 | 1.83481 | 2.00069 | 2.00069 |
| Zr | 9.6 | 11.6 | 8.0 | 11.0 | 11.6 | 11.6 |

| | Example 1 | Example 2 | Example 3 | Example 4 | Example 5 | Example 6 |
|---|---|---|---|---|---|---|
| (1) f2/fw | 12.83 | 18.83 | 9.28 | 12.81 | 11.36 | 12.72 |
| (2) ΔG2m/(TL × Zr) | 0.015 | 0.011 | 0.016 | 0.013 | 0.013 | 0.012 |
| (3) TL/Y | 31.75 | 28.39 | 27.63 | 31.76 | 28.39 | 28.39 |
| (4) Nd31 | 1.835 | 2.001 | 1.835 | 1.835 | 2.001 | 2.001 |
| (5) f4/fw | −5.23 | −3.76 | −4.08 | −3.96 | −4.09 | −3.78 |

As can be seen from the above-described data, each of the zoom lenses of Examples 1 to 6 is compact and light weight, has successfully corrected aberrations, has a high magnification with a zoom ratio in the range from 8× to 12×, and has good performance across the entire zoom range with preferably suppressed change of aberrations during magnification change, thereby achieving high optical performance.

Figure 15:
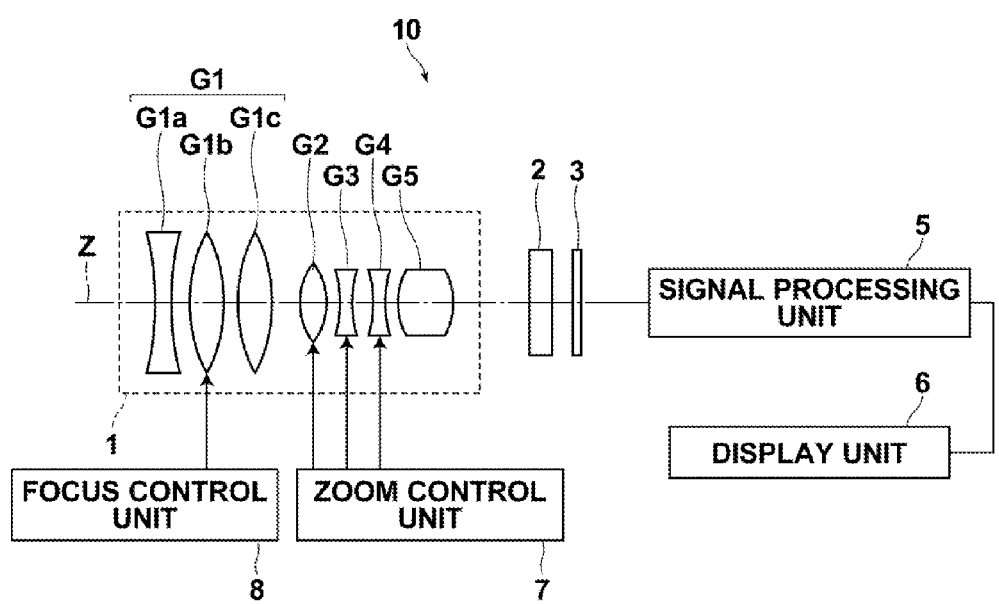
FIG. 15 is a diagram illustrating the schematic configuration of an imaging apparatus according to an embodiment of the invention.

Next, an imaging apparatus according to an embodiment of the invention is described with reference to FIG. 15. FIG. 15 illustrates the schematic configuration of an imaging apparatus 10 according to one embodiment of the invention employing a zoom lens 1 according to the embodiment of the invention. Examples of the imaging apparatus 10 include a digital camera, a video camera, a motion-picture camera, a broadcasting camera, a monitoring camera, etc.

The imaging apparatus 10 includes the zoom lens 1, a filter 2 disposed on the image side of the zoom lens 1, and an image sensor 3 disposed on the image side of the filter 2. It should be noted that, in FIG. 15, the first lens-group front group G1a, the first lens-group middle group G1b, the first lens-group rear group G1c, and the second to fifth lens groups G2 to G5 of the zoom lens 1 are schematically shown. The image sensor 3 converts an optical image formed by the zoom lens 1 into an electric signal. As the image sensor 3, a CCD (Charge Coupled Device) or a CMOS (Complementary Metal Oxide Semiconductor) may be used, for example. The image sensor 3 is disposed such that the imaging surface thereof is positioned in the same position as the image plane of the zoom lens 1.

The imaging apparatus 10 also includes a signal processing unit 5 that processes the signal outputted from the image sensor 3, a display unit 6 on which the image formed by the signal processing unit 5 is displayed, a zoom control unit 7 that controls magnification change of the zoom lens 1, and a focus control unit 8 that controls focusing of the zoom lens 1. It should be noted that, although one image sensor 3 is shown in FIG. 14, the imaging apparatus of the invention is not limited to the above-described example, and may be a so-called three-sensor imaging apparatus which includes three image sensors.

The present invention has been described with reference to the embodiments and the examples. However, the invention is not limited to the above-described embodiments and examples, and various modifications may be made to the invention. For example, lenses and the number of the lenses forming each lens group, the values of the radius of curvature, the surface distance, the refractive index, the Abbe number, and the aspheric coefficients of each lens are not limited to the values shown in the above-described examples.

What is claimed is:

1. A zoom lens consisting essentially of five lens groups consisting of, in order from an object side:
   a first lens group having a positive refractive power;
   a second lens group having a positive refractive power;
   a third lens group having a negative refractive power;
   a fourth lens group having a negative refractive power; and
   a fifth lens group having a positive refractive power,
   wherein, during magnification change from a wide-angle end to a telephoto end, the first lens group and the fifth lens group are fixed relative to an image plane, and the second lens group, the third lens group, and the fourth lens group are moved along an optical axis direction to change distances between the lens groups.

2. The zoom lens as claimed in claim 1, wherein the condition expression (1) below is satisfied:

$$5 < f2/fw \qquad (1),$$

where f2 is a focal length of the second lens group, and fw is a focal length of the entire system at the wide-angle end.

3. The zoom lens as claimed in claim 1, wherein the condition expression (2) below is satisfied:

$$0.005 < \Delta G2m/(TL \times Zr) < 0.050 \qquad (2),$$

where $\Delta G2m$ is a positional difference along the optical axis between a position of the second lens group at the wide-angle end and a position of the second lens group at the telephoto end, TL is a distance along the optical axis from a most object-side surface of the first lens group to the image plane, and Zr is a zoom ratio.

4. The zoom lens as claimed in claim 1, wherein the condition expression (3) below is satisfied:

$$TL/Y < 40 \qquad (3),$$

where TL is a distance along the optical axis from a most object-side surface of the first lens group to the image plane, and Y is a maximum image height.

5. The zoom lens as claimed in claim 1, where the condition expression (4) below is satisfied:

$$1.75 < Nd31 \qquad (4),$$

where Nd31 is a refractive index with respect to the d-line of a most object-side lens of the third lens group.

6. The zoom lens as claimed in claim 1, wherein the condition expression (5) below is satisfied:

$$-10 < f4/fw < -1 \qquad (5),$$

where f4 is a focal length of the fourth lens group, and fw is a focal length of the entire system at the wide-angle end.

7. The zoom lens as claimed in claim 1, wherein a position of the second lens group at the telephoto end is on the image side of a position of the second lens group at the wide-angle end.

8. The zoom lens as claimed in claim 1, wherein a position of the third lens group at the telephoto end is on the image side of a position of the third lens group at the wide-angle end.

9. The zoom lens as claimed in claim 1, wherein a position of the fourth lens group at the telephoto end is on the image side of a position of the fourth lens group at the wide-angle end.

10. The zoom lens as claimed in claim 1, wherein the first lens group consists essentially of, in order from the object side, a first lens-group front group having a negative refractive power, a first lens-group middle group having a positive refractive power, and a first lens-group rear group having a positive refractive power, and only the first lens-group middle group is moved along the optical axis direction during focusing.

11. An imaging apparatus comprising the zoom lens as claimed in claim 1.

12. A zoom lens consisting essentially of five lens groups consisting of, in order from the object side:
   a first lens group having a positive refractive power;
   a second lens group having a positive refractive power;
   a third lens group having a negative refractive power;
   a fourth lens group; and
   a fifth lens group having a positive refractive power,
   wherein, during magnification change from a wide-angle end to a telephoto end, the first lens group and the fifth lens group are fixed relative to an image plane, the second lens group, the third lens group, and the fourth lens group are moved along an optical axis direction to change distances between the lens groups, and the condition expression (1) below is satisfied:

$$5 < f2/fw \qquad (1),$$

where f2 is a focal length of the second lens group, and fw is a focal length of the entire system at the wide-angle end.

13. The zoom lens as claimed in claim 12, wherein the condition expression (2) below is satisfied:

$$0.005 < \Delta G2m/(TL \times Zr) < 0.050 \qquad (2),$$

where $\Delta G2m$ is a positional difference along the optical axis between a position of the second lens group at the wide-angle end and a position of the second lens group at the telephoto end, TL is a distance along the optical axis from a most object-side surface of the first lens group to the image plane, and Zr is a zoom ratio.

14. The zoom lens as claimed in claim 12, wherein the condition expression (3) below is satisfied:

$$TL/Y < 40 \qquad (3),$$

where TL is a distance along the optical axis from a most object-side surface of the first lens group to the image plane, and Y is a maximum image height.

15. The zoom lens as claimed in claim 12, where the condition expression (4) below is satisfied:

$$1.75 < Nd31 \qquad (4),$$

where Nd31 is a refractive index with respect to the d-line of a most object-side lens of the third lens group.

16. The zoom lens as claimed in claim 12, wherein the condition expression (5) below is satisfied:

$$-10 < f4/fw < -1 \tag{5},$$

where f4 is a focal length of the fourth lens group, and fw is a focal length of the entire system at the wide-angle end.

17. The zoom lens as claimed in claim 12, wherein a position of the second lens group at the telephoto end is on the image side of a position of the second lens group at the wide-angle end.

18. The zoom lens as claimed in claim 12, wherein a position of the third lens group at the telephoto end is on the image side of a position of the third lens group at the wide-angle end.

19. The zoom lens as claimed in claim 12, wherein the fourth lens group has a negative refractive power, and a position of the fourth lens group at the telephoto end is on the image side of a position of the fourth lens group at the wide-angle end.

20. An imaging apparatus comprising the zoom lens as claimed in claim 12.

* * * * *